United States Patent
Sunada

(10) Patent No.: US 10,359,895 B2
(45) Date of Patent: Jul. 23, 2019

(54) OPTICALLY TRANSPARENT ELECTROCONDUCTIVE MATERIAL

(71) Applicant: MITSUBISHI PAPER MILLS LIMITED, Tokyo (JP)

(72) Inventor: Kazuhiko Sunada, Tokyo (JP)

(73) Assignee: MITSUBISHI PAPER MILLS LIMITED, Tokyo (JP)

( * ) Notice: Subject to any disclaimer, the term of this patent is extended or adjusted under 35 U.S.C. 154(b) by 0 days.

(21) Appl. No.: 15/776,628

(22) PCT Filed: Nov. 9, 2016

(86) PCT No.: PCT/JP2016/083182
§ 371 (c)(1),
(2) Date: May 16, 2018

(87) PCT Pub. No.: WO2017/086216
PCT Pub. Date: May 26, 2017

(65) Prior Publication Data
US 2018/0341349 A1 Nov. 29, 2018

(30) Foreign Application Priority Data
Nov. 17, 2015 (JP) ................. 2015-224761

(51) Int. Cl.
*G06F 3/044* (2006.01)
*G02F 1/1333* (2006.01)
*G02F 1/1343* (2006.01)

(52) U.S. Cl.
CPC .......... *G06F 3/044* (2013.01); *G02F 1/13338* (2013.01); *G02F 1/134309* (2013.01);
(Continued)

(58) Field of Classification Search
USPC ....................................................... 345/174
See application file for complete search history.

(56) References Cited

U.S. PATENT DOCUMENTS 9,836,176 B1 * 12/2017 Yoshiki ................. G06F 3/044
2008/0182349 A1 7/2008 Yamazaki et al.
(Continued)

FOREIGN PATENT DOCUMENTS

JP 2011-216377 A 10/2011
JP 2013-037682 A 2/2013
(Continued)

OTHER PUBLICATIONS

K. Sugihara, "Mathematical Models of Territories: Introduction to Mathematical Engineering though Voronoi diagrams", Published by Kyoritsu Shuppan Co., Ltd. Feb. 25, 2009, vol. 1, pp. 1-5 (9 pages).
(Continued)

*Primary Examiner* — Chineyere D Wills-Burns
(74) *Attorney, Agent, or Firm* — Osha Liang LLP

(57) ABSTRACT

An optically transparent conductive material includes two layers including an upper conductive layer and a lower conductive layer in a stack with an insulation layer therebetween. The upper conductive layer and the lower conductive layer each include at least sensor parts to be electrically connected to terminal areas and dummy parts not to be electrically connected to the terminal areas, the sensor parts and the dummy parts each being formed in a net-like irregular pattern of metal thin wires. The sensor parts of the lower conductive layer are formed with multiple linear electrodes that extend in a first direction and that are repetitively aligned with a period L in a second direction, and the sensor parts of the upper conductive layer are formed with multiple linear electrodes that extend in a third direction and that are repetitively aligned with a period M in a fourth direction.

6 Claims, 16 Drawing Sheets

(52) U.S. Cl.
CPC .............. *G06F 2203/04103* (2013.01); *G06F 2203/04112* (2013.01)

(56) References Cited

U.S. PATENT DOCUMENTS

| | | | |
|---|---|---|---|
| 2011/0102361 A1* | 5/2011 | Philipp | G06F 3/044 345/174 |
| 2011/0102370 A1* | 5/2011 | Kono | G06F 3/044 345/174 |
| 2012/0031746 A1 | 2/2012 | Hwang et al. | |
| 2013/0189502 A1* | 7/2013 | Takahashi | B29C 59/002 428/195.1 |
| 2013/0215067 A1 | 8/2013 | Hwang et al. | |
| 2013/0222328 A1* | 8/2013 | Cok | G06F 3/044 345/174 |
| 2014/0111711 A1* | 4/2014 | Iwami | B32B 7/02 349/12 |
| 2014/0198269 A1* | 7/2014 | Hwang | G02B 5/1866 349/12 |
| 2014/0218325 A1 | 8/2014 | Iwami | |
| 2014/0218642 A1* | 8/2014 | Iwami | G06F 3/044 349/12 |
| 2014/0332262 A1* | 11/2014 | Yoshiki | G06F 3/044 174/264 |
| 2015/0177876 A1* | 6/2015 | Ishii | G06F 3/044 345/174 |
| 2016/0149572 A1* | 5/2016 | Chen | G06F 3/044 345/173 |
| 2017/0031482 A1 | 2/2017 | Yoshiki et al. | |

FOREIGN PATENT DOCUMENTS

| | | |
|---|---|---|
| JP | 2013-37683 A | 2/2013 |
| JP | 2013-93014 A | 5/2013 |
| JP | 2013-540331 A | 10/2013 |
| JP | 2014-17519 A | 1/2014 |
| JP | 2014-529841 A | 11/2014 |
| WO | 2015/163364 A1 | 10/2015 |

OTHER PUBLICATIONS

International Search Report issued in International Application No. PCT/JP2016/083182, dated Jan. 10, 2017 (2 pages).

* cited by examiner

FIG.3
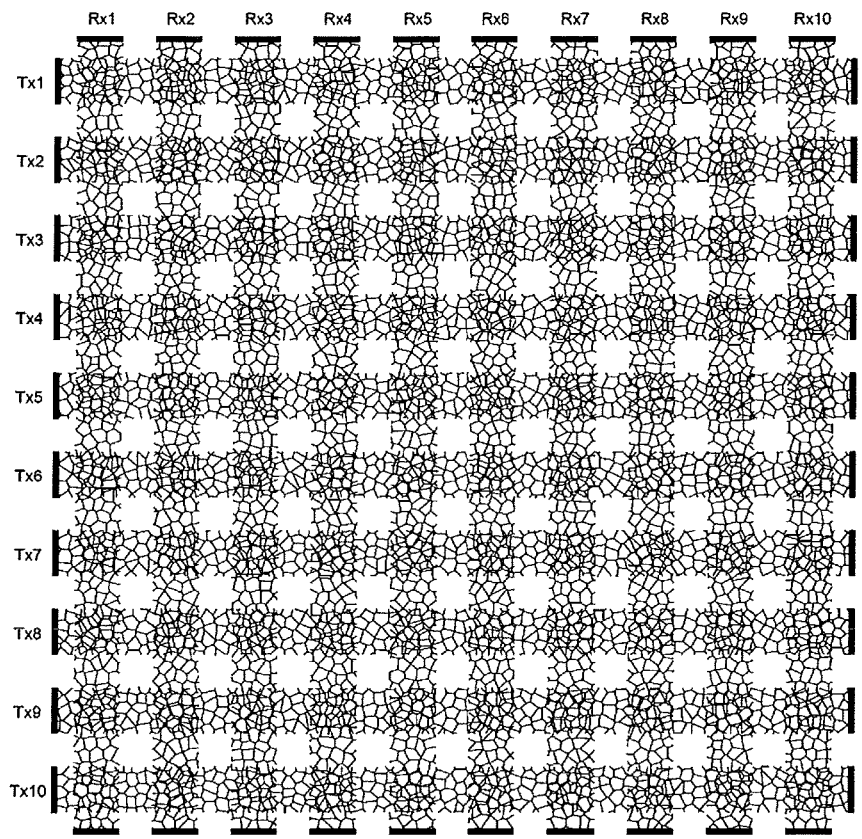
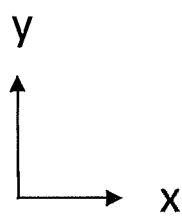

FIG.4
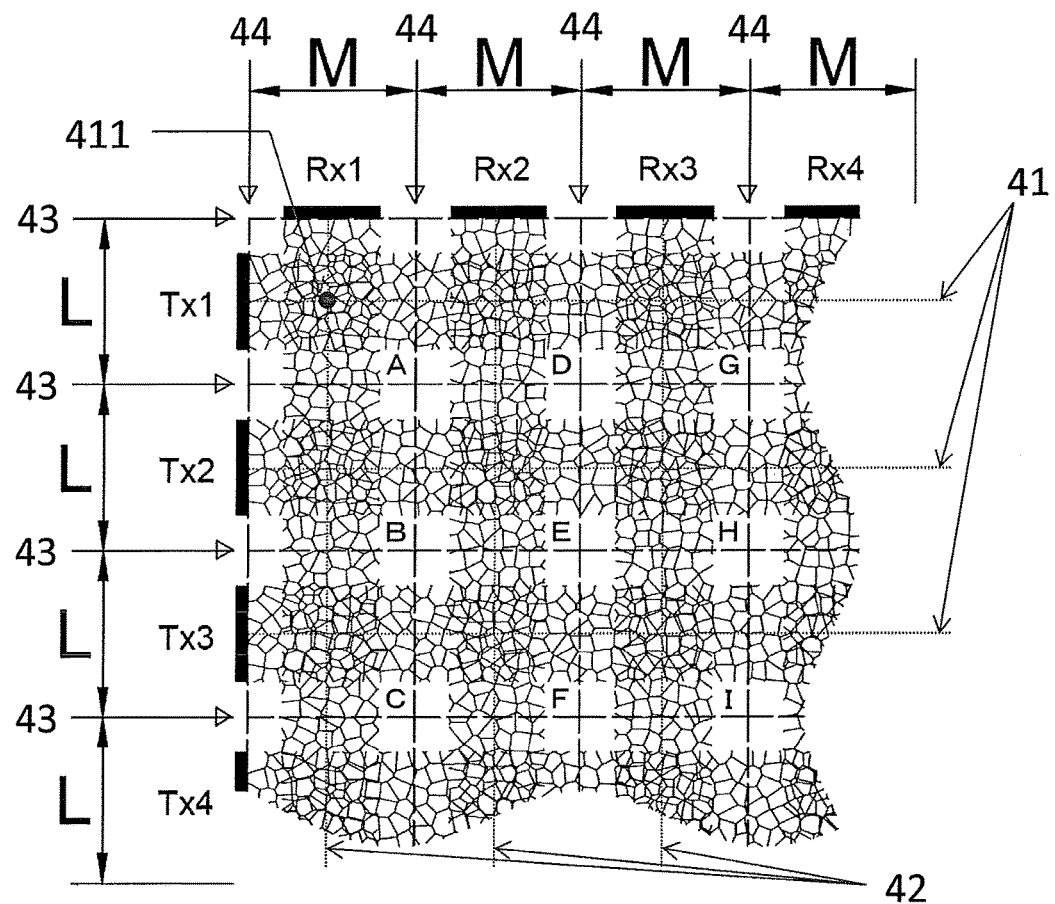
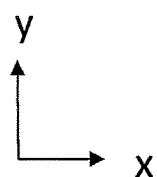

FIG.6
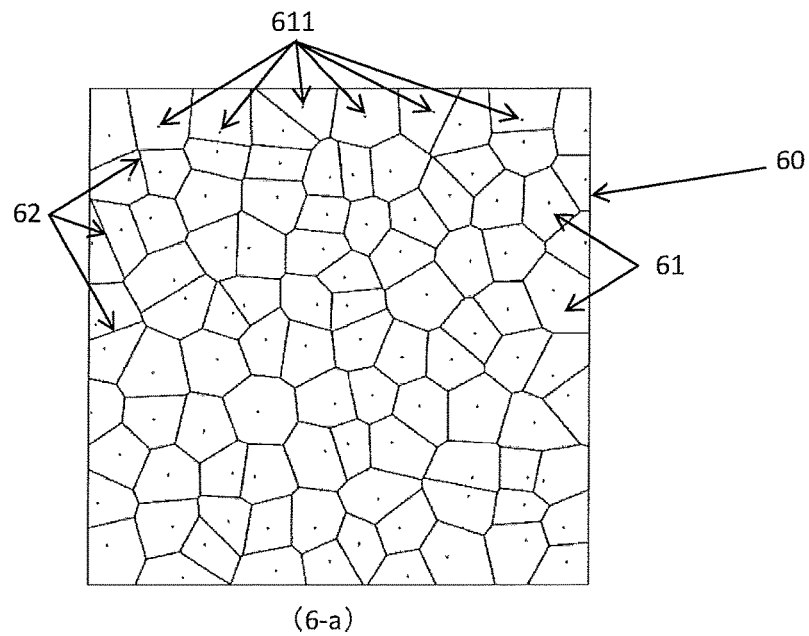
(6-a)
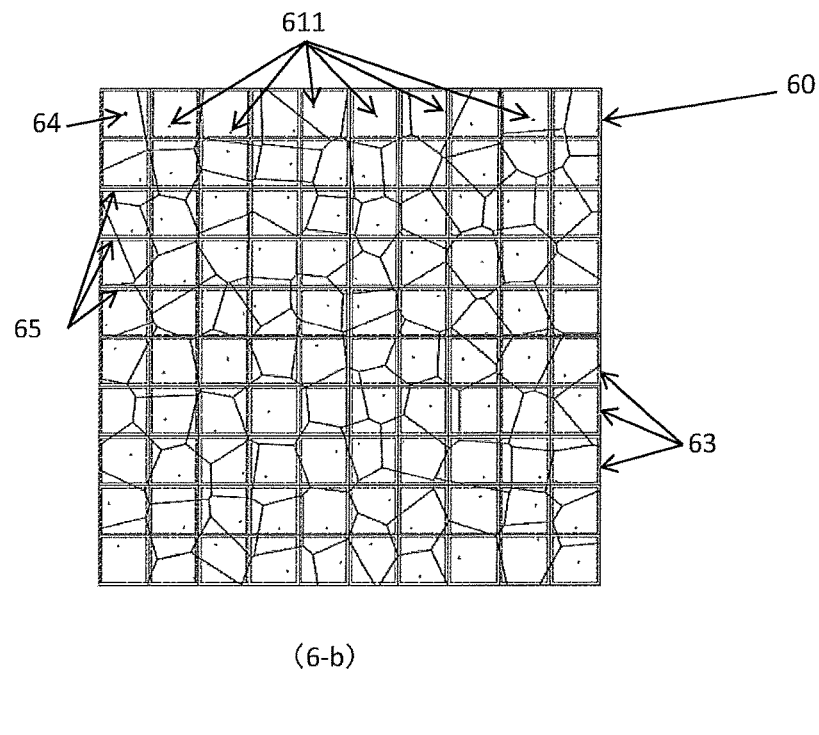
(6-b)

FIG.8
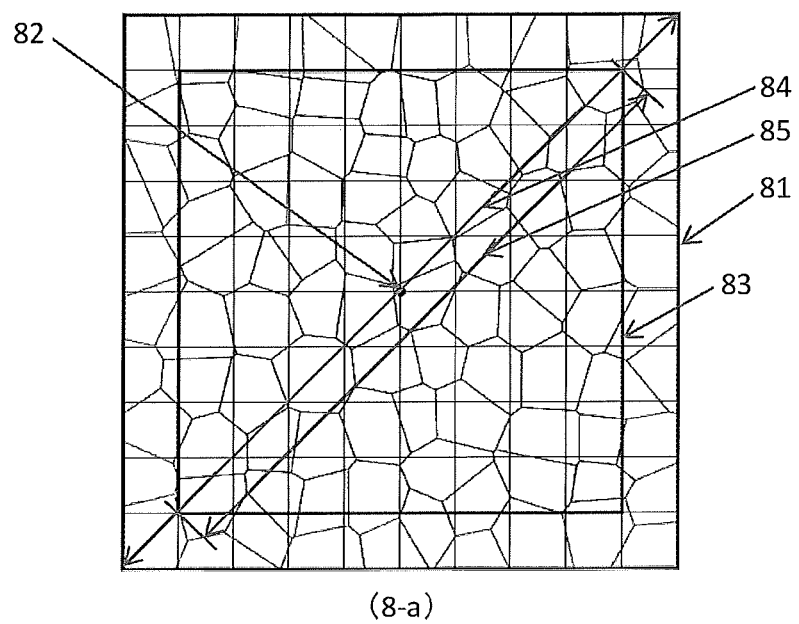
(8-a)
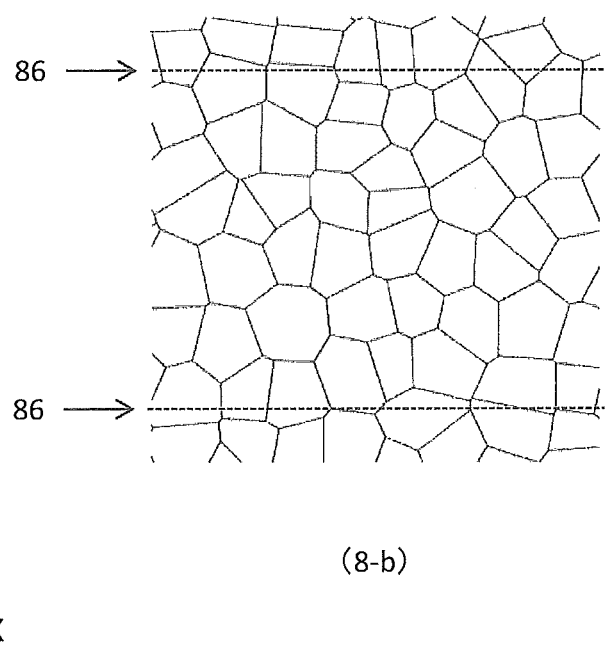
(8-b)

| | (Rx1) | (Rx2) | (Rx3) | (Rx4) | (Rx5) | (Rx6) | (Rx7) | (Rx8) | (Rx9) | (Rx10) |
|---|---|---|---|---|---|---|---|---|---|---|
| Tx1 | 87.7 / 101.9 / 102.9 | 98.2 / 86.1 / 95.5 / 98.9 | 104.7 / 90.1 / 101.7 / 102.2 | 98.3 / 88.6 / 101.6 / 99.2 | 98.4 / 87.1 / 98.8 / 101.5 | 101.2 / 88.2 / 99.5 / 97.9 | 100.5 / 88.6 / 102.2 / 100.5 | 97.9 / 86.7 / 97.4 / 97.9 | 102.7 / 89.0 / 102.7 / 98.8 | 97.4 / 86.7 / 101.0 |
| Tx2 | 97.2 / 85.2 / 98.0 / 97.8 | 101.1 / 102.1 / 87.0 / 98.7 / 99.9 | 97.9 / 101.3 / 88.2 / 98.7 / 102.7 | 100.8 / 101.3 / 89.3 / 104.0 / 101.6 | 98.5 / 96.1 / 85.8 / 95.3 / 96.1 | 102.2 / 105.0 / 90.1 / 102.2 / 101.2 | 99.5 / 97.9 / 88.2 / 99.5 / 102.7 | 102.2 / 100.5 / 88.6 / 98.3 / 98.3 | 101.2 / 101.7 / 90.1 / 105.0 / 103.5 | 99.0 / 95.3 / 85.8 / 97.9 |
| Tx3 | 102.3 / 87.2 / 100.1 / 98.4 | 100.1 / 99.9 / 87.1 / 101.5 / 100.5 | 97.4 / 98.5 / 85.8 / 97.6 / 97.8 | 98.5 / 102.4 / 87.9 / 98.5 / 98.8 | 104.0 / 101.6 / 89.3 / 100.3 / 102.5 | 98.8 / 99.7 / 89.0 / 103.7 / 103.4 | 97.4 / 96.4 / 85.8 / 95.3 / 96.9 | 101.7 / 105.0 / 90.1 / 103.5 / 103.5 | 96.6 / 96.6 / 87.0 / 99.3 / 101.4 | 102.2 / 100.8 / 87.7 / 99.9 |
| Tx4 | 101.6 / 88.6 / 102.2 / 100.1 | 99.5 / 97.8 / 86.7 / 98.8 / 98.8 | 102.2 / 101.2 / 87.8 / 98.6 / 99.1 | 101.3 / 101.4 / 89.0 / 102.2 / 104.4 | 97.6 / 97.9 / 87.1 / 101.2 / 98.4 | 96.7 / 98.8 / 86.1 / 97.2 / 99.3 | 103.2 / 102.9 / 88.6 / 101.8 / 98.3 | 96.6 / 98.3 / 87.0 / 101.4 / 99.8 | 98.6 / 98.6 / 85.8 / 97.8 / 96.8 | 100.1 / 102.2 / 87.8 / 100.8 |
| Tx5 | 99.9 / 88.6 / 100.7 / 101.8 | 101.4 / 99.3 / 87.9 / 99.3 / 100.8 | 100.9 / 100.7 / 88.6 / 103.9 / 100.5 | 95.8 / 96.3 / 85.2 / 96.3 / 99.3 | 101.6 / 103.9 / 88.6 / 102.2 / 101.6 | 100.7 / 97.9 / 86.7 / 96.2 / 97.8 | 101.7 / 103.9 / 90.1 / 103.3 / 102.2 | 100.2 / 96.8 / 87.2 / 98.4 / 96.8 | 103.3 / 101.6 / 88.6 / 101.8 / 101.6 | 99.2 / 98.2 / 87.0 / 102.1 |
| Tx6 | 98.3 / 87.0 / 99.8 / 98.2 | 99.2 / 100.2 / 87.2 / 98.9 / 99.2 | 99.5 / 101.1 / 88.2 / 102.7 / 101.1 | 100.7 / 97.4 / 85.8 / 98.5 / 97.9 | 98.4 / 101.5 / 87.1 / 98.3 / 102.2 | 102.2 / 101.7 / 88.6 / 100.5 / 101.8 | 97.9 / 99.5 / 88.2 / 97.9 / 98.7 | 103.3 / 102.2 / 90.1 / 103.3 / 104.7 | 98.4 / 96.8 / 87.2 / 102.3 / 100.6 | 98.0 / 97.8 / 85.2 / 98.0 |
| Tx7 | 101.8 / 88.6 / 100.8 / 99.6 | 100.8 / 99.2 / 87.9 / 100.8 / 101.4 | 98.9 / 99.2 / 87.2 / 99.5 / 98.4 | 102.2 / 100.5 / 87.7 / 102.9 / 97.3 | 97.8 / 97.2 / 85.2 / 98.0 / 97.0 | 98.2 / 102.1 / 87.0 / 97.5 / 98.2 | 101.3 / 102.6 / 89.3 / 103.7 / 104.0 | 95.5 / 96.4 / 86.1 / 99.3 / 98.2 | 99.4 / 100.7 / 86.7 / 99.6 / 98.6 | 102.1 / 100.4 / 87.0 / 99.9 |
| Tx8 | 100.4 / 89.0 / 102.7 / 101.3 | 98.6 / 97.4 / 86.7 / 97.8 / 97.9 | 101.6 / 102.2 / 88.6 / 98.4 / 103.0 | 102.7 / 101.6 / 90.1 / 102.4 / 103.3 | 103.1 / 97.6 / 87.9 / 99.2 / 102.4 | 101.8 / 100.8 / 88.6 / 103.3 / 100.5 | 96.1 / 96.8 / 85.8 / 97.9 / 98.4 | 101.9 / 102.2 / 87.7 / 99.7 / 99.9 | 101.4 / 100.3 / 87.9 / 100.9 / 98.5 | 100.1 / 99.1 / 87.1 / 100.5 |
| Tx9 | 98.8 / 87.9 / 99.3 / 100.9 | 102.2 / 100.7 / 88.6 / 102.9 / 99.5 | 97.1 / 97.2 / 86.1 / 98.7 / 100.3 | 96.8 / 101.3 / 87.2 / 101.6 / 98.0 | 97.6 / 98.4 / 85.8 / 97.4 / 95.3 | 99.5 / 102.7 / 88.2 / 101.1 / 99.5 | 101.6 / 98.9 / 87.2 / 99.4 / 99.4 | 100.1 / 100.6 / 87.8 / 98.3 / 97.4 | 101.6 / 101.7 / 89.3 / 103.0 / 102.5 | 99.5 / 97.1 / 86.7 / 101.7 |
| Tx10 | 99.1 / 87.1 / 97.8 | 100.5 / 102.2 / 89.0 / 103.7 | 99.7 / 96.4 / 85.8 / 96.4 | 102.1 / 103.7 / 89.0 / 98.8 | 105.0 / 101.2 / 90.1 / 101.6 | 100.5 / 98.4 / 88.6 / 101.0 | 100.6 / 99.0 / 87.8 / 97.4 | 102.6 / 102.6 / 90.1 / 103.4 | 97.6 / 96.7 / 87.1 | 98.3 / 97.8 / 85.2 |

FIG.11

|  | Rx1 | Rx2 | Rx3 | Rx4 | Rx5 | Rx6 | Rx7 | Rx8 | Rx9 | Rx10 |
|---|---|---|---|---|---|---|---|---|---|---|
| (Tx1) | 98.3 / 85.2 / 95.4 / 101.8 | 86.7 / 96.7 / 99.1 | 103.5 / 89.7 / 99.8 / 100.3 | 100.2 / 89.9 / 103.9 / 103.9 | 96.2 / 86.5 / 96.8 / 96.9 | 103.4 / 89.4 / 101.2 / 102.6 | 98.8 / 88.3 / 99.3 / 100.9 | 100.7 / 88.9 / 99.4 / 99.4 | 100.6 / 89.4 / 101.4 / 99.7 | 98.7 / 88.2 / 100.2 |
| (Tx2) | 104.8 / 89.3 / 102.1 / 101.5 | 100.9 / 87.5 / 97.9 / 101.2 | 99.7 / 102.2 / 89.4 / 103.4 / 102.6 | 96.2 / 96.8 / 86.5 / 96.9 / 98.9 | 103.2 / 89.3 / 102.5 / 101.1 | 97.4 / 87.1 / 97.5 / 99.5 / 99.5 | 99.1 / 100.5 / 87.5 / 97.9 / 97.3 | 100.6 / 102.2 / 89.4 / 99.7 / 101.6 | 100.3 / 100.3 / 89.7 / 101.9 / 100.3 | 99.8 / 98.1 / 88.0 / 98.5 |
| (Tx3) | 98.5 / 88.0 / 101.7 / 103.3 | 98.9 / 86.5 / 99.3 / 98.3 | 97.4 / 100.7 / 87.1 / 99.5 / 102.2 | 101.2 / 100.5 / 87.5 / 99.1 / 100.5 | 98.9 / 100.9 / 88.3 / 100.9 / 102.1 | 100.5 / 99.1 / 87.5 / 97.3 / 99.4 | 102.7 / 102.7 / 89.9 / 102.2 / 103.9 | 98.4 / 97.9 / 88.0 / 98.4 / 101.5 | 99.7 / 101.6 / 89.4 / 100.1 / 102.6 | 101.5 / 99.9 / 89.3 / 100.0 |
| (Tx4) | 96.8 / 85.2 / 96.8 / 95.4 | 101.7 / 103.3 / 88.0 / 103.3 / 100.6 | 97.8 / 96.8 / 85.2 / 97.8 / 97.4 | 99.5 / 102.2 / 87.1 / 100.7 / 99.5 | 98.0 / 99.3 / 86.5 / 98.3 / 99.8 | 100.6 / 101.7 / 88.0 / 101.7 / 101.7 | 96.2 / 98.3 / 86.5 / 99.8 / 98.9 | 98.5 / 100.2 / 86.7 / 99.5 / 97.0 | 97.4 / 100.5 / 87.1 / 97.5 / 96.9 | 100.0 / 102.5 / 89.3 / 99.6 |
| (Tx5) | 104.8 / 89.3 / 102.1 / 100.4 | 99.4 / 98.0 / 87.5 / 100.0 / 99.1 | 102.7 / 100.0 / 87.5 / 100.0 / 98.0 | 100.5 / 100.0 / 87.5 / 100.9 / 100.0 | 100.2 / 99.1 / 86.7 / 100.2 / 97.1 | 98.3 / 99.8 / 86.5 / 98.9 / 98.1 | 101.2 / 101.2 / 87.5 / 97.9 / 100.0 | 103.1 / 102.2 / 89.4 / 99.4 / 104.9 | 103.2 / 100.6 / 89.9 / 100.2 / 100.7 | 100.4 / 98.8 / 89.7 / 103.5 |
| (Tx6) | 99.6 / 88.9 / 100.7 / 100.7 | 100.9 / 99.3 / 88.3 / 98.9 / 100.9 | 102.1 / 101.1 / 89.3 / 102.1 / 99.6 | 100.0 / 98.0 / 87.5 / 98.0 / 100.0 | 103.0 / 102.1 / 89.3 / 101.2 / 99.3 | 102.0 / 98.8 / 88.2 / 100.8 / 100.2 | 100.0 / 99.2 / 87.5 / 102.7 / 101.2 | 95.3 / 97.4 / 85.2 / 95.4 / 96.6 | 99.3 / 104.8 / 89.3 / 103.0 / 102.1 | 96.7 / 97.1 / 86.7 / 100.2 |
| (Tx7) | 99.3 / 88.3 / 100.9 / 101.4 | 99.1 / 99.1 / 87.5 / 97.5 / 98.4 | 100.4 / 102.5 / 89.7 / 102.5 / 103.5 | 100.0 / 97.5 / 87.5 / 97.3 / 98.4 | 100.7 / 102.7 / 89.9 / 102.2 / 101.8 | 99.8 / 97.9 / 88.0 / 101.7 / 101.7 | 98.9 / 98.3 / 86.5 / 98.1 / 98.9 | 103.5 / 102.0 / 88.2 / 100.8 / 103.5 | 98.0 / 99.2 / 87.5 / 101.2 / 100.0 | 99.8 / 98.9 / 86.5 / 98.1 |
| (Tx8) | 98.6 / 87.1 / 98.0 / 97.1 | 101.6 / 102.1 / 88.9 / 102.5 / 102.5 | 96.7 / 97.5 / 86.7 / 97.5 / 99.5 | 101.6 / 102.5 / 88.9 / 100.7 / 99.6 | 98.2 / 99.3 / 88.3 / 102.1 / 101.8 | 98.3 / 98.0 / 86.5 / 98.9 / 98.9 | 101.2 / 101.2 / 87.5 / 102.7 / 97.3 | 96.6 / 97.4 / 85.2 / 97.4 / 97.8 | 100.0 / 102.7 / 87.5 / 99.2 / 98.4 | 102.0 / 100.8 / 88.2 / 98.8 |
| (Tx9) | 103.0 / 89.7 / 103.5 / 101.6 | 97.5 / 96.7 / 86.7 / 99.5 / 98.3 | 100.5 / 100.5 / 87.1 / 97.5 / 97.5 | 100.4 / 102.5 / 89.3 / 103.0 / 102.1 | 98.2 / 97.1 / 86.7 / 99.1 / 97.0 | 101.2 / 100.9 / 87.5 / 97.3 / 101.2 | 102.7 / 102.7 / 89.9 / 103.2 / 103.2 | 102.2 / 96.9 / 87.1 / 98.0 / 97.4 | 101.6 / 102.1 / 88.9 / 99.6 / 99.6 | 101.2 / 100.4 / 89.3 / 103.2 |
| (Tx10) | 98.4 / 88.3 / 100.1 | 101.7 / 99.9 / 88.2 / 98.3 | 102.5 / 101.2 / 89.3 / 102.1 | 98.0 / 98.0 / 87.5 / 97.9 | 103.1 / 102.2 / 89.4 / 103.4 | 98.9 / 96.8 / 86.5 / 99.3 | 96.9 / 100.7 / 87.1 / 97.4 | 102.6 / 102.6 / 89.4 / 100.1 | 100.4 / 99.9 / 89.3 / 103.2 | 96.9 / 96.9 / 86.5 |

FIG.12

|  | (Rx1) | (Rx2) | (Rx3) | (Rx4) | (Rx5) | (Rx6) | (Rx7) | (Rx8) | (Rx9) | (Rx10) |
|---|---|---|---|---|---|---|---|---|---|---|
| Tx1 | 99.8 / 87.2 / 100.2 / 102.3 | 102.3 / 87.0 / 97.8 / 101.1 | 99.5 / 89.0 / 100.5 / 101.3 | 98.5 / 88.6 / 101.6 / 99.9 | 102.4 / 87.2 / 97.7 / 100.6 | 99.2 / 89.3 / 100.8 / 100.7 | 101.7 / 88.6 / 98.3 / 101.0 | 98.4 / 90.1 / 101.6 / 101.7 | 98.9 / 88.6 / 101.1 / 100.5 | 87.7 / 101.9 |
| Tx2 | 97.8 / 85.2 / 99.0 / 98.3 | 98.9 / 101.0 / 86.1 / 97.9 / 98.8 | 98.8 / 102.2 / 87.9 / 99.2 / 102.4 | 100.1 / 100.8 / 88.6 / 102.2 / 100.8 | 99.4 / 97.8 / 86.7 / 97.8 / 98.9 | 99.3 / 102.2 / 88.6 / 101.1 / 100.8 | 99.0 / 98.9 / 87.7 / 99.0 / 101.9 | 98.3 / 101.0 / 88.6 / 100.5 / 101.0 | 99.5 / 99.5 / 88.2 / 102.4 / 102.4 | 98.2 / 97.6 / 86.1 / 98.7 |
| Tx3 | 101.7 / 86.7 / 99.5 / 97.8 | 101.2 / 100.5 / 87.1 / 101.5 / 97.6 | 97.6 / 98.5 / 85.8 / 97.6 / 97.8 | 99.2 / 102.4 / 87.9 / 100.3 / 99.7 | 101.2 / 99.7 / 87.7 / 99.7 / 100.6 | 99.2 / 100.3 / 87.9 / 102.2 / 100.3 | 98.2 / 97.9 / 86.1 / 98.2 / 98.7 | 99.0 / 101.9 / 87.7 / 101.9 / 101.9 | 97.6 / 98.2 / 86.1 / 98.7 / 100.3 | 101.3 / 101.3 / 87.2 / 99.4 |
| Tx4 | 102.2 / 88.6 / 99.3 / 101.1 | 102.5 / 100.7 / 89.3 / 101.7 / 101.6 | 102.2 / 98.3 / 87.8 / 99.6 / 99.1 | 100.3 / 100.5 / 88.2 / 101.2 / 101.7 | 99.4 / 98.8 / 87.1 / 99.4 / 98.4 | 99.7 / 100.6 / 87.7 / 100.5 / 100.8 | 101.3 / 99.5 / 87.2 / 101.3 / 98.0 | 98.2 / 98.7 / 86.1 / 100.3 / 98.2 | 99.7 / 99.7 / 85.8 / 97.8 / 99.0 | 100.6 / 102.2 / 87.8 / 102.0 |
| Tx5 | 98.9 / 87.7 / 99.7 / 98.2 | 98.5 / 100.3 / 87.9 / 99.3 / 97.6 | 100.9 / 100.7 / 88.6 / 102.2 / 100.7 | 98.3 / 97.9 / 86.7 / 97.9 / 101.0 | 101.6 / 102.2 / 88.6 / 101.8 / 101.6 | 99.3 / 98.3 / 87.0 / 97.8 / 98.2 | 102.1 / 102.3 / 89.0 / 101.5 / 99.7 | 101.9 / 98.5 / 87.7 / 101.2 / 98.5 | 101.0 / 98.9 / 86.7 / 100.7 / 99.4 | 98.1 / 99.3 / 86.1 / 101.0 |
| Tx6 | 101.8 / 89.3 / 99.1 / 100.7 | 102.4 / 100.9 / 90.1 / 102.4 / 102.4 | 99.3 / 97.6 / 87.9 / 102.4 / 100.8 | 99.0 / 97.6 / 85.8 / 98.5 / 97.9 | 98.4 / 101.5 / 87.1 / 98.3 / 101.5 | 101.8 / 101.7 / 88.6 / 99.3 / 102.2 | 100.3 / 100.7 / 89.3 / 100.3 / 101.3 | 101.5 / 99.7 / 89.0 / 102.1 / 102.3 | 100.6 / 98.0 / 87.2 / 102.3 / 100.6 | 99.0 / 97.8 / 85.2 / 99.0 |
| Tx7 | 99.3 / 88.6 / 100.8 / 100.5 | 97.6 / 99.2 / 87.9 / 100.8 / 97.6 | 99.2 / 99.2 / 87.2 / 99.5 / 98.4 | 102.2 / 100.5 / 87.7 / 102.2 / 98.5 | 98.5 / 97.9 / 85.8 / 99.0 / 97.9 | 97.8 / 101.0 / 86.7 / 99.3 / 98.3 | 98.7 / 101.7 / 88.2 / 101.3 / 102.4 | 97.8 / 98.7 / 87.0 / 100.4 / 99.8 | 99.4 / 99.6 / 86.7 / 100.7 / 98.6 | 101.0 / 99.3 / 86.1 / 98.8 |
| Tx8 | 99.5 / 88.2 / 97.9 / 100.3 | 102.4 / 102.2 / 90.1 / 101.6 / 101.7 | 101.6 / 98.4 / 88.6 / 99.6 / 101.8 | 101.5 / 100.4 / 89.0 / 101.5 / 102.1 | 102.2 / 98.5 / 87.7 / 99.5 / 101.9 | 101.7 / 100.5 / 88.2 / 102.4 / 101.7 | 97.6 / 97.6 / 86.1 / 98.7 / 98.7 | 100.2 / 101.3 / 87.2 / 99.2 / 99.4 | 101.4 / 100.8 / 87.9 / 100.9 / 99.2 | 101.2 / 99.1 / 87.1 / 100.5 |
| Tx9 | 99.7 / 87.9 / 99.3 / 100.9 | 98.3 / 100.7 / 88.6 / 101.8 / 100.7 | 98.2 / 98.3 / 87.0 / 99.8 / 100.4 | 98.0 / 102.2 / 87.2 / 101.3 / 98.4 | 98.2 / 98.7 / 86.1 / 100.7 / 97.6 | 98.3 / 100.6 / 86.7 / 99.4 / 97.8 | 101.3 / 100.6 / 87.2 / 99.4 / 99.4 | 100.6 / 100.6 / 87.8 / 99.0 / 98.6 | 100.8 / 101.0 / 88.6 / 102.2 / 101.7 | 99.5 / 97.8 / 86.7 / 101.7 |
| Tx10 | 99.1 / 87.1 / 99.1 / 100.9 | 99.3 / 100.9 / 87.9 / 101.4 / 100.7 | 99.6 / 98.6 / 86.7 / 97.8 / 100.4 | 101.6 / 102.2 / 88.6 / 100.5 / 98.4 | 102.4 / 99.5 / 88.2 / 98.5 / 97.6 | 102.2 / 100.5 / 88.6 / 101.0 / 97.8 | 100.6 / 99.0 / 87.8 / 98.6 / 99.4 | 101.4 / 101.4 / 89.0 / 98.6 / 98.6 | 98.3 / 97.9 / 87.1 / 102.2 / 101.7 | 98.3 / 97.8 / 85.2 / 101.7 |

FIG.13

|   | Rx1 | Rx2 | Rx3 | Rx4 | Rx5 | Rx6 | Rx7 | Rx8 | Rx9 | Rx10 |
|---|---|---|---|---|---|---|---|---|---|---|
| (Tx1) | 88.2 98.8 / 101.2 89.3 99.6 / 101.7 102.1 | 100.4 89.7 99.8 / 101.9 | 100.2 99.9 100.2 / 101.1 | 99.8 89.7 101.7 / 101.7 | 98.3 88.2 98.9 / 101.3 | 100.1 88.3 98.2 / 100.9 | 101.8 89.9 100.6 / 100.6 | 99.4 89.4 101.2 / 99.7 | 98.8 88.3 / 100.3 |
| (Tx2) | 98.3 / 86.7 99.1 / 98.5 | 98.0 / 100.9 87.5 99.4 / 101.2 | 98.1 / 100.6 88.0 99.0 / 101.0 | 98.9 / 101.0 88.9 100.8 / 101.6 | 98.3 / 99.2 88.2 101.3 / 99.9 | 98.8 / 98.8 87.1 99.5 / 99.5 | 99.1 / 100.5 87.5 97.9 / 98.0 | 99.4 / 102.2 89.4 99.7 / 101.6 | 100.3 / 100.3 89.7 101.9 / 101.7 | 99.7 / 98.1 88.0 / 98.5 |
| (Tx3) | 101.5 / 88.0 101.7 / 98.1 | 98.9 / 98.3 86.5 99.3 / 98.3 | 99.0 / 100.7 87.1 99.5 / 98.0 | 98.4 / 100.5 87.5 99.1 / 100.5 | 100.1 / 100.9 88.3 100.9 / 101.8 | 100.5 / 99.1 87.5 98.0 / 99.4 | 102.1 / 102.1 89.3 101.5 / 101.1 | 98.4 / 98.5 88.0 99.8 / 97.9 | 98.3 / 100.2 88.2 98.8 / 99.2 | 101.5 / 101.2 89.3 / 100.0 |
| (Tx4) | 101.9 / 89.7 101.9 / 100.4 | 101.7 / 98.1 88.0 99.0 / 100.6 | 102.1 / 101.0 88.9 102.1 / 101.6 | 99.5 / 98.0 87.1 100.5 / 99.5 | 98.2 / 99.5 86.7 98.5 / 98.3 | 100.6 / 101.5 88.0 99.7 / 101.7 | 98.9 / 100.3 88.3 98.2 / 100.9 | 102.2 / 101.8 89.9 101.1 / 101.1 | 100.8 / 98.9 88.9 99.6 / 99.6 | 100.0 / 100.4 89.3 / 101.2 |
| (Tx5) | 99.6 / 89.3 102.1 / 100.4 | 99.4 / 98.0 87.5 100.0 / 99.1 | 98.4 / 100.0 87.5 100.0 / 98.0 | 100.5 / 100.0 87.5 100.0 / 100.0 | 101.7 / 100.8 87.5 99.2 / 99.9 | 98.3 / 100.8 88.2 102.0 / 98.1 | 99.1 / 98.1 86.5 98.9 / 100.0 | 98.9 / 101.2 87.5 98.4 / 99.6 | 100.4 / 101.6 88.9 99.6 / 99.9 | 98.8 / 100.4 89.3 101.2 / 100.8 | 98.8 88.2 / 100.8 |
| (Tx6) | 99.6 / 88.9 100.7 / 100.7 | 100.9 / 99.3 88.3 98.9 / 100.9 | 102.1 / 101.1 89.3 102.1 / 99.9 | 100.0 / 98.0 87.5 99.1 / 100.0 | 100.1 / 100.9 88.3 100.1 / 101.4 | 102.0 / 99.9 88.2 100.8 / 100.2 | 100.0 / 99.2 87.5 98.0 / 101.2 | 100.4 / 102.1 89.3 99.9 / 101.2 | 100.1 / 100.1 89.4 102.2 / 102.2 | 99.2 / 97.9 87.5 / 101.2 |
| (Tx7) | 99.3 / 88.3 100.9 / 101.4 | 99.1 / 99.1 87.5 97.9 / 98.4 | 100.1 / 102.2 89.4 102.2 / 101.6 | 100.0 / 97.9 87.5 100.5 / 98.0 | 98.6 / 99.5 87.1 99.0 / 98.8 | 99.8 / 101.0 88.0 101.7 / 101.7 | 98.9 / 98.3 86.5 98.1 / 98.9 | 98.8 / 102.0 88.2 100.8 / 99.2 | 97.9 / 99.2 87.5 101.2 / 100.0 | 98.9 / 98.9 86.5 / 98.3 |
| (Tx8) | 98.6 / 87.1 98.0 / 102.2 | 101.6 / 102.1 88.9 101.0 / 102.1 | 98.4 / 99.0 88.0 98.5 / 100.6 | 102.1 / 101.5 89.3 101.2 / 102.1 | 101.3 / 98.8 88.2 102.0 / 101.7 | 98.3 / 98.1 86.5 98.9 / 98.9 | 101.2 / 101.2 87.5 98.4 / 100.9 | 100.8 / 101.6 88.9 101.6 / 102.1 | 100.0 / 98.4 87.5 99.4 / 98.4 | 101.7 / 100.6 88.0 / 98.5 |
| (Tx9) | 97.8 / 85.2 97.8 / 98.5 | 98.0 / 102.2 87.1 99.5 / 98.8 | 99.4 / 100.5 87.5 100.0 / 100.9 | 98.0 / 100.0 87.5 100.9 / 100.5 | 98.3 / 99.1 86.7 91.1 / 101.8 | 101.2 / 100.9 87.5 100.9 / 101.2 | 99.1 / 99.1 86.7 99.5 / 101.8 | 98.0 / 100.5 87.1 98.0 / 100.7 | 101.6 / 102.1 88.9 99.6 / 100.7 | 101.5 / 100.4 89.3 / 99.9 |
| (Tx10) | 101.5 / 86.5 98.1 / | 101.3 / 102.0 88.2 101.7 / | 99.1 / 98.3 86.7 99.5 / | 99.5 / 100.5 87.1 102.2 / | 98.3 / 97.9 85.2 98.5 / | 98.9 / 101.5 86.5 101.5 / | 98.3 / 98.5 85.2 98.5 / | 99.3 / 101.5 86.5 98.0 / | 99.3 / 102.1 88.3 98.3 / | 100.1 / 101.2 89.4 / |

FIG.14

| | (Rx1) | (Rx2) | (Rx3) | (Rx4) | (Rx5) | (Rx6) | (Rx7) | (Rx8) | (Rx9) | (Rx10) |
|---|---|---|---|---|---|---|---|---|---|---|
| Tx1 | 101.9 87.7 95.5 / 102.9 | 98.2 86.1 / 98.9 | 104.7 90.1 101.7 / 102.2 | 98.3 88.6 101.6 / 99.2 | 98.4 87.1 98.8 / 101.5 | 101.2 88.2 99.5 / 97.9 | 100.5 88.6 102.2 / 100.5 | 97.9 86.7 97.4 / 97.9 | 102.7 89.0 102.7 / 98.8 | 97.4 86.7 / 101.0 |
| Tx2 | 97.2 / 85.2 98.0 / 97.8 | 101.1 / 102.1 87.0 98.7 / 99.9 | 97.9 / 101.3 88.2 98.7 / 102.7 | 100.8 / 101.3 89.3 104.0 / 101.6 | 98.5 / 96.1 85.8 95.3 / 96.1 | 102.2 / 105.0 90.1 102.2 / 101.2 | 99.5 / 97.9 88.2 99.5 / 102.7 | 102.2 / 100.5 88.6 98.3 / 98.3 | 101.2 / 101.7 90.1 105.0 / 105.7 | 99.0 / 95.3 85.8 / 97.9 |
| Tx3 | 102.3 / 87.2 100.1 / 98.4 | 100.1 / 99.9 87.1 101.5 / 100.5 | 97.4 / 98.5 85.8 97.6 / 97.8 | 98.5 / 102.4 87.9 98.5 / 98.8 | 104.0 / 101.6 89.3 100.3 / 102.5 | 98.8 / 99.7 89.0 103.7 / 103.4 | 97.4 / 96.4 85.8 95.3 / 96.9 | 101.7 / 105.0 90.1 105.7 / 103.5 | 94.6 / 94.6 85.2 97.2 / 99.3 | 102.2 / 102.9 87.7 / 99.9 |
| Tx4 | 101.6 / 88.6 102.2 / 100.1 | 99.5 / 97.8 86.7 98.8 / 98.6 | 102.2 / 101.2 87.8 98.6 / 99.1 | 101.3 / 101.4 89.0 102.2 / 104.4 | 97.6 / 97.9 87.1 101.2 / 98.4 | 96.7 / 98.8 86.1 97.2 / 99.3 | 103.2 / 102.9 88.6 101.8 / 98.3 | 96.6 / 98.3 87.0 101.4 / 99.8 | 100.7 / 98.6 85.8 97.8 / 96.8 | 100.1 / 102.2 87.8 / 100.8 |
| Tx5 | 99.9 / 88.6 100.7 / 101.8 | 101.4 / 99.3 87.9 99.3 / 100.8 | 100.9 / 100.7 88.6 103.9 / 100.5 | 95.8 / 96.3 85.2 96.3 / 99.3 | 101.6 / 103.9 88.6 102.2 / 101.6 | 100.7 / 97.9 86.7 96.2 / 97.8 | 101.7 / 103.9 90.1 103.3 / 102.2 | 100.2 / 96.8 87.2 98.4 / 96.8 | 103.3 / 101.6 88.6 101.8 / 101.6 | 99.2 / 98.2 87.0 / 102.1 |
| Tx6 | 98.3 / 87.0 99.8 / 98.2 | 99.2 / 100.2 87.2 98.9 / 99.2 | 99.5 / 101.1 88.2 102.7 / 101.1 | 100.7 / 97.4 85.8 98.5 / 97.9 | 98.4 / 101.5 87.1 98.3 / 102.2 | 102.2 / 101.7 88.6 100.5 / 101.8 | 97.9 / 99.5 88.2 97.9 / 98.7 | 103.3 / 102.2 90.1 103.3 / 104.7 | 98.4 / 96.8 87.2 102.3 / 100.6 | 98.0 / 97.8 85.2 / 98.0 |
| Tx7 | 101.8 / 88.6 100.8 / 99.6 | 100.8 / 99.2 87.9 100.8 / 101.4 | 98.9 / 99.2 87.2 99.5 / 98.4 | 102.2 / 100.5 87.7 102.9 / 97.3 | 97.8 / 97.2 85.2 98.0 / 97.0 | 98.2 / 102.1 87.0 97.5 / 98.2 | 101.3 / 102.6 89.3 103.7 / 104.0 | 95.5 / 96.4 86.1 99.3 / 98.2 | 99.4 / 100.7 86.7 99.6 / 98.6 | 102.1 / 100.4 87.0 / 99.9 |
| Tx8 | 100.4 / 89.0 102.7 / 101.3 | 98.6 / 97.4 86.7 97.8 / 97.9 | 101.6 / 102.2 88.6 98.4 / 103.0 | 102.7 / 101.6 90.1 102.4 / 105.7 | 103.1 / 97.6 87.9 99.2 / 102.4 | 101.8 / 100.8 88.6 103.3 / 100.5 | 96.1 / 96.8 85.8 97.9 / 98.4 | 101.9 / 102.2 87.7 99.7 / 99.9 | 101.4 / 100.3 87.9 100.9 / 98.5 | 100.1 / 99.1 87.1 / 100.5 |
| Tx9 | 98.8 / 87.9 99.3 / 100.9 | 102.2 / 100.7 88.6 102.9 / 99.5 | 97.1 / 97.2 86.1 101.0 / 100.3 | 94.6 / 98.0 85.2 99.3 / 95.8 | 97.6 / 100.7 85.8 97.4 / 95.3 | 98.5 / 102.7 88.2 101.1 / 99.5 | 101.6 / 98.9 87.2 99.4 / 99.4 | 100.1 / 100.6 87.8 98.3 / 97.4 | 101.6 / 101.7 89.3 103.0 / 102.5 | 99.5 / 97.1 86.7 / 101.7 |
| Tx10 | 99.1 / 87.1 97.9 | 100.5 / 102.2 89.0 103.7 | 99.7 / 96.4 85.8 96.4 | 104.4 / 103.7 89.0 98.8 | 105.0 / 101.2 90.1 101.6 | 100.5 / 98.4 88.6 101.0 | 100.6 / 99.0 87.8 97.4 | 102.6 / 102.6 90.1 103.4 | 97.6 / 96.7 87.1 102.2 | 98.3 / 97.8 85.2 |

FIG.15

| | Rx1 | Rx2 | Rx3 | Rx4 | Rx5 | Rx6 | Rx7 | Rx8 | Rx9 | Rx10 |
|---|---|---|---|---|---|---|---|---|---|---|
| (Tx1) | 85.2 / 98.3 / 95.4 | 101.8 / 86.7 / 96.7 / 99.1 | 103.5 / 89.7 / 99.8 / 105.3 | 100.2 / 89.9 / 103.9 / 103.9 | 96.2 / 86.5 / 96.8 / 96.9 | 103.4 / 89.4 / 101.2 / 102.6 | 98.8 / 88.3 / 99.3 / 100.9 | 100.7 / 88.9 / 99.4 / 99.4 | 100.6 / 89.4 / 101.4 / 99.7 | 98.7 / 88.2 / 100.2 |
| (Tx2) | 104.8 / 89.3 / 102.1 / 101.5 | 100.9 / 87.5 / 102.7 / 101.2 | 95.0 / 97.4 / 85.2 / 98.5 / 97.8 | 96.2 / 101.5 / 86.5 / 96.9 / 98.9 | 103.2 / 103.2 / 89.3 / 102.5 / 101.1 | 97.4 / 97.5 / 87.1 / 99.5 / 99.5 | 99.1 / 100.5 / 87.5 / 97.9 / 97.3 | 100.6 / 102.2 / 89.4 / 99.7 / 101.6 | 100.3 / 100.3 / 89.7 / 101.9 / 105.3 | 99.8 / 98.1 / 88.0 / 98.5 |
| (Tx3) | 98.5 / 88.0 / 101.7 / 103.3 | 98.9 / 86.5 / 99.3 / 98.3 | 102.2 / 100.7 / 87.1 / 99.5 / 102.2 | 101.2 / 100.5 / 87.5 / 98.1 / 100.5 | 98.9 / 100.9 / 88.3 / 100.9 / 102.1 | 100.5 / 89.1 / 87.5 / 97.3 / 99.4 | 102.7 / 102.7 / 89.9 / 102.2 / 103.9 | 98.4 / 97.9 / 88.0 / 103.3 / 101.5 | 95.0 / 96.8 / 85.2 / 95.4 / 97.8 | 101.5 / 104.8 / 89.3 / 100.0 |
| (Tx4) | 96.8 / 85.2 / 96.8 / 95.4 | 101.7 / 88.0 / 103.3 / 100.6 | 97.8 / 96.8 / 85.2 / 97.8 / 97.4 | 99.5 / 102.2 / 87.1 / 100.7 / 99.5 | 98.0 / 99.3 / 86.5 / 98.3 / 99.8 | 100.6 / 101.7 / 88.0 / 101.7 / 98.1 | 96.2 / 98.3 / 86.5 / 99.8 / 98.9 | 98.5 / 100.2 / 86.7 / 99.5 / 97.0 | 102.2 / 100.5 / 87.1 / 97.5 / 96.9 | 100.0 / 102.5 / 89.3 / 99.6 |
| (Tx5) | 104.8 / 89.3 / 102.1 / 100.4 | 99.4 / 98.0 / 87.5 / 100.0 / 99.1 | 102.7 / 100.0 / 87.5 / 100.0 / 98.0 | 100.5 / 100.0 / 87.5 / 100.9 / 100.0 | 100.2 / 99.1 / 86.7 / 96.7 / 97.1 | 101.9 / 103.5 / 89.7 / 102.5 / 101.7 | 101.2 / 97.5 / 87.5 / 97.9 / 100.0 | 103.1 / 100.2 / 89.4 / 99.4 / 104.9 | 103.2 / 100.6 / 89.9 / 100.2 / 100.7 | 100.4 / 99.8 / 89.7 / 103.5 |
| (Tx6) | 99.6 / 88.9 / 100.7 / 100.7 | 100.9 / 99.3 / 88.3 / 98.9 / 100.9 | 102.1 / 101.1 / 89.3 / 102.1 / 99.6 | 100.0 / 98.0 / 87.5 / 98.0 / 100.0 | 103.0 / 102.1 / 89.3 / 101.2 / 99.3 | 98.3 / 98.8 / 88.2 / 100.8 / 100.2 | 100.0 / 99.2 / 87.5 / 102.7 / 101.2 | 95.3 / 97.4 / 85.2 / 95.4 / 96.6 | 99.3 / 104.8 / 89.3 / 103.0 / 102.1 | 96.7 / 97.1 / 86.7 / 100.2 |
| (Tx7) | 99.3 / 88.3 / 100.9 / 101.4 | 99.1 / 99.1 / 87.5 / 97.5 / 98.4 | 100.4 / 102.5 / 89.7 / 102.5 / 103.5 | 100.0 / 97.5 / 87.5 / 97.3 / 98.4 | 100.7 / 102.7 / 89.9 / 97.9 / 101.8 | 99.8 / 97.9 / 88.0 / 101.7 / 101.7 | 98.9 / 98.3 / 86.5 / 98.1 / 98.9 | 103.5 / 102.0 / 88.2 / 100.8 / 103.5 | 98.0 / 99.2 / 87.5 / 101.2 / 100.0 | 99.8 / 98.9 / 86.5 / 98.1 |
| (Tx8) | 98.6 / 87.1 / 98.0 / 97.1 | 101.6 / 102.1 / 88.9 / 102.5 / 102.5 | 96.7 / 97.5 / 86.7 / 97.5 / 99.5 | 101.6 / 102.5 / 88.9 / 100.7 / 99.6 | 98.2 / 99.3 / 88.3 / 102.1 / 101.8 | 98.3 / 98.0 / 86.5 / 98.9 / 98.9 | 101.2 / 101.2 / 87.5 / 102.7 / 97.3 | 96.6 / 97.4 / 85.2 / 97.4 / 97.8 | 100.0 / 102.7 / 87.5 / 99.2 / 98.4 | 102.0 / 100.8 / 88.2 / 98.8 |
| (Tx9) | 103.0 / 89.7 / 103.5 / 101.6 | 97.5 / 96.7 / 86.7 / 99.5 / 98.3 | 100.5 / 100.5 / 87.1 / 97.5 / 97.5 | 100.4 / 102.5 / 89.3 / 103.0 / 102.1 | 98.2 / 97.1 / 86.7 / 99.1 / 97.0 | 101.2 / 100.9 / 87.5 / 97.3 / 97.5 | 102.7 / 102.7 / 89.9 / 103.2 / 105.5 | 102.2 / 96.9 / 87.1 / 98.0 / 97.4 | 101.6 / 102.1 / 88.9 / 99.6 / 99.6 | 101.2 / 100.4 / 89.3 / 103.2 |
| (Tx10) | 98.4 / 88.3 / 100.1 | 101.7 / 99.9 / 88.2 / 98.8 | 102.5 / 101.2 / 89.3 / 102.1 | 98.0 / 98.0 / 87.5 / 97.9 | 103.1 / 102.2 / 89.4 / 99.7 | 102.5 / 100.3 / 89.7 / 103.3 | 104.8 / 95.0 / 85.2 / 95.3 | 102.6 / 104.9 / 89.4 / 100.1 | 100.4 / 99.9 / 89.3 / 103.2 | 96.9 / 96.9 / 86.5 |

FIG.16

|  | (Rx1) | (Rx2) | (Rx3) | (Rx4) | (Rx5) | (Rx6) | (Rx7) | (Rx8) | (Rx9) | (Rx10) |
|---|---|---|---|---|---|---|---|---|---|---|
| Tx1 | 87.7 101.9 / 102.9 | 98.2 86.1 95.5 / 98.9 | 104.7 90.1 101.7 / 102.2 | 98.3 88.6 101.6 / 99.2 | 98.4 87.1 98.8 / 101.5 | 101.2 88.2 99.5 / 97.9 | 100.5 88.6 102.2 / 100.5 | 97.9 86.7 97.4 / 97.9 | 102.7 89.0 102.7 / 98.8 | 97.4 86.7 / 101.0 |
| Tx2 | 97.2 / 85.2 98.0 / 97.8 | 101.1 / 102.1 87.0 98.7 / 99.9 | 97.9 / 101.3 88.2 98.7 / 102.7 | 100.8 / 101.3 89.3 104.0 / 101.6 | 98.5 / 96.1 85.8 95.3 / 96.1 | 102.2 / 106.0 90.1 102.2 / 101.2 | 99.5 / 97.9 88.2 99.5 / 102.7 | 102.2 / 100.5 88.6 98.3 / 98.3 | 101.2 / 101.7 90.1 105.0 / 103.5 | 99.0 / 95.3 85.8 / 97.9 |
| Tx3 | 102.3 / 87.2 100.1 / 98.4 | 100.1 / 99.9 87.1 101.5 / 100.5 | 97.4 / 98.5 85.8 97.6 / 97.8 | 98.5 / 102.4 87.9 98.5 / 98.8 | 104.0 / 101.6 89.3 100.3 / 102.5 | 98.8 / 99.7 89.0 103.7 / 103.4 | 97.4 / 96.4 85.8 95.3 / 96.9 | 101.7 / 105.0 90.1 103.5 / 103.5 | 96.6 / 96.6 87.0 99.3 / 101.4 | 102.2 / 100.8 87.7 / 99.9 |
| Tx4 | 101.6 / 88.6 102.2 / 100.1 | 99.5 / 97.8 86.7 98.8 / 98.6 | 102.2 / 101.2 87.8 98.6 / 99.1 | 101.3 / 101.4 89.0 102.2 / 104.4 | 97.6 / 97.9 87.1 101.2 / 98.4 | 96.7 / 98.8 86.1 97.2 / 99.3 | 103.2 / 102.9 88.6 101.8 / 98.3 | 96.6 / 98.3 87.0 101.4 / 99.8 | 98.6 / 98.6 85.8 97.8 / 96.8 | 100.1 / 102.2 87.8 / 100.8 |
| Tx5 | 99.9 / 88.6 100.7 / 101.8 | 101.4 / 99.3 87.9 99.3 / 100.8 | 100.9 / 100.7 88.6 103.9 / 100.5 | 95.8 / 96.3 85.2 96.3 / 99.3 | 101.6 / 103.9 88.6 102.2 / 101.6 | 100.7 / 97.9 86.7 96.2 / 97.8 | 101.7 / 103.9 90.1 103.3 / 100.0 | 100.2 / 96.8 87.2 98.4 / 96.8 | 103.3 / 101.6 88.6 101.8 / 101.6 | 99.2 / 98.2 87.0 / 102.1 |
| Tx6 | 98.3 / 87.0 98.2 / 98.2 | 99.2 / 100.2 87.2 98.9 / 99.2 | 99.5 / 101.1 88.2 102.7 / 101.1 | 100.7 / 97.4 85.8 98.5 / 97.9 | 98.4 / 101.5 87.1 98.3 / 102.2 | 102.2 / 101.7 88.6 98.4 / 101.8 | 100.0 / 101.6 90.1 100.0 / 100.9 | 103.3 / 100.0 90.1 103.3 / 104.7 | 98.4 / 96.8 87.2 102.3 / 100.6 | 98.0 / 97.8 85.2 / 98.0 |
| Tx7 | 101.8 / 88.6 100.8 / 99.6 | 100.8 / 99.2 87.9 100.8 / 101.4 | 98.9 / 99.2 87.2 99.5 / 98.4 | 102.2 / 100.5 87.7 102.9 / 97.3 | 97.8 / 97.2 85.2 98.0 / 97.0 | 98.2 / 102.1 87.0 97.5 / 98.2 | 99.1 / 102.6 89.3 103.7 / 104.0 | 95.5 / 96.4 86.1 98.3 / 98.2 | 99.4 / 100.7 86.7 99.6 / 98.6 | 102.1 / 100.4 87.0 / 99.9 |
| Tx8 | 100.4 / 89.0 102.7 / 101.3 | 98.6 / 97.4 86.7 97.8 / 97.9 | 101.6 / 102.2 88.6 98.4 / 103.0 | 102.7 / 101.6 90.1 102.4 / 103.3 | 103.1 / 97.6 87.9 99.2 / 102.4 | 101.8 / 100.8 88.6 103.3 / 100.5 | 96.1 / 96.8 85.8 97.9 / 98.4 | 101.9 / 102.2 87.7 98.7 / 99.9 | 101.4 / 100.3 87.9 100.9 / 98.5 | 100.1 / 99.1 87.1 / 100.5 |
| Tx9 | 98.8 / 87.9 99.3 / 100.9 | 102.2 / 100.7 88.6 102.9 / 99.5 | 97.1 / 97.2 86.1 101.3 / 100.3 | 96.8 / 98.2 87.2 101.6 / 98.0 | 97.6 / 98.4 85.8 97.4 / 95.3 | 99.5 / 102.7 88.2 101.1 / 99.5 | 101.6 / 98.9 87.2 99.4 / 99.4 | 100.1 / 100.6 87.8 99.4 / 97.4 | 101.6 / 101.7 89.3 103.0 / 102.5 | 99.5 / 97.1 86.7 / 101.7 |
| Tx10 | 99.1 / 87.1 97.9 / 100.9 | 100.5 / 102.2 89.0 103.7 / 99.5 | 99.7 / 96.4 85.8 96.4 / 100.3 | 102.1 / 103.7 89.0 98.8 / 98.0 | 105.0 / 101.2 90.1 101.6 / 95.3 | 100.5 / 98.4 88.6 101.0 / 99.5 | 100.6 / 99.0 87.8 97.4 / 99.4 | 102.6 / 102.6 90.1 103.4 / 97.4 | 97.6 / 96.7 87.1 102.2 / 102.5 | 98.3 / 97.8 85.2 / 101.7 |

OPTICALLY TRANSPARENT ELECTROCONDUCTIVE MATERIAL

TECHNICAL FIELD

The present invention mainly relates to an optically transparent conductive material for touchscreens. More specifically, the present invention relates to an optically transparent conductive material suitable for touch sensors of projected capacitive touchscreens.

BACKGROUND ART

Touchscreens are widely used as input means on various displays of devices such as smart devices such as personal digital assistants (PDAs), laptop computers, smartphones, and tablet computers; other electronic devices such as office automation equipment, medical equipment, and car navigation systems; and home electric appliances.

There are various touchscreens that utilize different position detection methods, such as optical, ultrasonic, resistive, surface capacitive, and projected capacitive touchscreens. In resistive touchscreens, a touch sensor includes an optically transparent conductive material and a glass plate with an optically transparent conductive layer, which face each other with a spacer therebetween. An electrical current is applied to the optically transparent conductive material, and the voltage in the glass plate with an optically transparent conductive layer is measured. In contrast, in capacitive touchscreens, a touch sensor basically includes an optically transparent conductive material having an optically transparent conductive layer disposed on an optically transparent support. Since such a touch sensor does not include movable parts, capacitive touchscreens have high durability and high optical transmittance, and are thus used in various applications. Further, among projected capacitive touchscreens, mutual capacitive touchscreens are particularly widely used in devices such as smartphones and tablet PCs because these touchscreens are capable of simultaneous multipoint detection.

Conventional optically transparent conductive materials for touch sensors in touchscreens include an ITO (indium-tin oxide) conductive film as an optically transparent conductive layer formed on an optically transparent support. Yet, ITO conductive films have a high refractive index and high surface reflectivity, so that optically transparent conductive materials including an ITO conductive film unfortunately have low optical transparency. In addition, due to low flexibility, such ITO conductive films are prone to crack when an optically transparent conductive material is bent, resulting in an increased electrical resistance of the optically transparent conductive material.

A known optically transparent conductive material as an alternative to the one having an optically transparent conductive layer formed of an ITO conductive film is an optically transparent conductive material having, as an optically transparent conductive layer, a pattern of metal thin wires on an optically transparent support, in which the line width, pitch, and pattern design, for example, of the pattern are appropriately adjusted. This technology provides an optically transparent conductive material capable of maintaining a high optical transparency and having a high conductivity. Regarding the net-like pattern of the metal thin wires (hereinafter also referred to as the "metal pattern"), it is known that a repetitive unit of any shape can be used. Known examples of repetitive units include triangles such as equilateral triangles, isosceles triangles, and right triangles; quadrangles such as squares, rectangles, rhombuses, parallelograms, and trapezoids; regular n-sided polygons such as regular hexagons, regular octagons, regular dodecagons, and regular icosagons; circles; ellipses; stars; and combinational patterns of two or more thereof.

As a method for producing the optically transparent conductive material having a net-like metal pattern, a semi-additive method has been proposed. In this method, a thin catalytic layer is formed on a support having an underlayer metal layer, a pattern is formed thereon using a photosensitive resist, a metal layer is stacked on resist opening portions by plating, and lastly, the resist layer and an underlayer metal protected by the resist layer are removed. Thus, a metal pattern is formed.

In addition, recently known techniques include a method in which a silver halide photography photosensitive material for image formation by a silver salt diffusion transfer process is used as a conductive-material precursor. In this method, a silver halide photography photosensitive material (conductive-material precursor) including at least a physical development nucleus layer and a silver halide emulsion layer formed in this order on a support is subjected to pattern exposure, and then reacted with a soluble silver halide forming agent and a reducing agent in an alkaline fluid. Thus, a metal (silver) pattern is formed. This patterning method can form a pattern of metal thin wires having a uniform wire width, and can also provide high conductivity with a narrower wire width compared to patterns produced by other methods because silver has the highest conductivity of all metals. Further, a layer having the metal pattern produced by this method is advantageous in that it has higher flexibility and higher bending resistance than ITO conductive films.

When an optically transparent conductive material having such a metal pattern disposed on an optically transparent support is used for a touch sensor of a touchscreen, the optically transparent conductive material is superimposed on a liquid crystal display. Thus, the period of the metal pattern and the period of the liquid crystal display element interfere with each other, causing a problem of moire. Recent use of liquid crystal displays with various resolutions further complicates the problem of moire.

To solve this problem, for example, JP 2011-216377 A (Patent Literature 1), JP 2013-37683 A (Patent Literature 2), JP 2014-17519 A (Patent Literature 3), JP 2013-93014 A (Patent Literature 4), and JP 2013-540331 T (Patent Literature 5) propose methods for suppressing interference by using, as a pattern of metal thin wires, a traditional random pattern described in, for example, "Mathematical Models of Territories—Introduction to Mathematical Engineering through Voronoi diagram" (Non-Patent Literature 1).

CITATION LIST

Patent Literature

Patent Literature 1: JP 2011-216377 A
Patent Literature 2: JP 2013-37683 A
Patent Literature 3: JP 2014-17519 A
Patent Literature 4: JP 2013-93014 A
Patent Literature 5: JP 2013-540331 T

Non-Patent Literature

Non-Patent Literature 1: Mathematical Models of Territories—Introduction to Mathematical Engineering through Voronoi diagram (published by Kyoritsu Shuppan Co., Ltd. in February 2009)

SUMMARY OF INVENTION

Technical Problem

When an optically transparent conductive material is used for a touch sensor of projected capacitive touchscreen, two optically transparent conductive layers each including a portion having a linear electrode pattern are stacked with an insulation layer therebetween such that the linear electrodes of one conductive layer intersect the linear electrodes of the other conductive layer so as to provide an optically transparent conductive material including an upper conductive layer and a lower conductive layer. Thus, the linear electrodes of the upper conductive layer (hereinafter also referred to as the "upper linear electrodes") and the linear electrodes of the lower conductive layer (hereinafter also referred to as the "lower linear electrodes") are disposed to oppose each other at some portions with an insulation layer therebetween. Capacitance is generated at each opposing position, and a touch on the touchscreen with the finger changes the capacitance. In the case of a mutual capacitive touchscreen among projected capacitive touchscreens, the electrodes on one side regarded as transmission electrodes (Tx) and the electrodes on the other side regarded as reception electrodes (Rx) are scanned or sensed to allow for detection of changes in the capacitance at individual intersections (node positions) between the upper linear electrodes and the lower linear electrodes. Here, in the case where the pattern of the metal thin wires in each conductive layer is a random pattern, each node position is formed in a different metal pattern, so that the capacitance varies at each node position, resulting in lower detection sensitivity. When the capacitance varies significantly, the difference cannot be corrected even when a detection circuit is used, making the touchscreen inoperable. Especially in sensing, there is a case where a more specific finger contact position between multiple node positions is calculated from subtle changes in the capacitance at the multiple node positions. In such a case, a partial reduction in the sensitivity may impose a serious problem. Meanwhile, it is possible to equalize the capacitance at each node position by arranging the same random pattern repeatedly at each node position. In this case, however, peculiar pattern irregularity associated with variations in the density of metal thin wires is visually recognized at regular intervals each corresponding to the distance between adjacent node positions.

An object of the present invention is to provide an optically transparent conductive material that does not cause moire or pattern irregularity even when superimposed on a liquid crystal display and that suppresses variations in the capacitance at each node position.

Solution to Problem

The above problem is basically solved by an optically transparent conductive material including: two layers (an upper conductive layer and a lower conductive layer) in a stack with an insulation layer therebetween, wherein the upper conductive layer and the lower conductive layer each include at least sensor parts to be electrically connected to terminal areas and dummy parts not to be electrically connected to the terminal areas, the sensor parts and the dummy parts each being formed in a net-like irregular pattern of metal thin wires, the sensor parts of the lower conductive layer are formed with multiple linear electrodes that extend in a first direction and that are repetitively aligned with a period L in a second direction perpendicular to the first direction with the dummy part between each linear electrode, and the sensor parts of the upper conductive layer are formed with multiple linear electrodes that extend in a third direction and that are repetitively aligned with a period M in a fourth direction perpendicular to the third direction with the dummy part between each linear electrode, in a view from a direction perpendicular to a conductive layer plane, in the case where an intersection as a node between a centerline of each linear electrode of the upper conductive layer and a centerline of each linear electrode of the lower conductive layer is regarded as the center of gravity; zones obtained by dividing the conductive layer plane into quadrangles by straight lines each obtained by shifting the centerline of each linear electrode of the lower conductive layer in the second direction by half the length equivalent to the period L and by straight lines each obtained by shifting the centerline of each linear electrode of the upper conductive layer in the fourth direction by half the length equivalent to the period M are regarded as node unit zones; a node unit zone sharing a side of a quadrangle of an arbitrary selected node unit zone is regarded as an adjacent node unit zone; in each node unit zone, a quadrangle whose diagonal length is 80% of the diagonal length of the node unit zone is regarded as a reduced quadrangle A; and in each adjacent node unit zone, a quadrangle whose diagonal length is 80% of the diagonal length of the adjacent node unit zone is regarded as a reduced quadrangle B, in each of the upper conductive layer and the lower conductive layer, the net-like pattern of metal thin wires in the reduced quadrangle A is not the same as the net-like pattern of metal thin wires in the reduced quadrangle B, and the total metal thin wire length in the reduced quadrangle A is 95 to 105% of the total metal thin wire length in the reduced quadrangle B.

Here, each node unit zone preferably has the same center of gravity as the reduced quadrangle in the node unit zone. The total metal thin wire length in the reduced quadrangle A is preferably 97.5 to 102.5% of the total metal thin wire length in the reduced quadrangle B. The sensor parts and the dummy parts in one conductive layer are each preferably formed in a pattern of metal thin wires with the same wire width. The centerline of each linear electrode of the upper conductive layer preferably perpendicularly intersects the centerline of each linear electrode of the lower conductive layer. The net-like pattern of the metal thin wires is preferably a net-like pattern formed with Voronoi edges based on generators or a net-like pattern obtained by unidirectionally stretching the net-like pattern formed with Voronoi edges based on generators.

Advantageous Effects of Invention

The present invention can provide an optically transparent conductive material that does not cause moire or pattern irregularity even when superimposed on a liquid crystal display and that suppresses variations in the capacitance at each node position.

BRIEF DESCRIPTION OF DRAWINGS

FIG. 3 is a schematic plan view of the optically transparent conductive material of the present invention including the upper conductive layer and the lower conductive layer in a stack.

FIG. 4 is a view for describing node unit zones.

FIG. 6 is a view for describing a Voronoi diagram.

FIG. 8 is a view for describing how to determine the length of thin wires in a reduced quadrangle when the view shown in FIG. 6 is regarded as a single node unit zone.

FIG. 10 is a view for describing an example.

FIG. 11 is a view for describing an example.

FIG. 12 is a view for describing an example.

FIG. 13 is a view for describing an example.

FIG. 14 is a view for describing an example.

FIG. 15 is a view for describing an example.

FIG. 16 is a view for describing an example.

DESCRIPTION OF EMBODIMENTS

Hereinafter, the present invention is described in detail with reference to the drawings, but it is needless to say that the present invention is not limited to the following embodiments, and various alterations and modifications may be made without departing from the technical scope of the invention. Further, the terms as used herein are selected with consideration to functions described in the embodiments. When the terms as used herein are specifically defined herein, these terms should be construed in accordance with the given definitions. Non-specifically defined terms should be construed to mean as generally understood by those skilled in the art.

Figure 1:
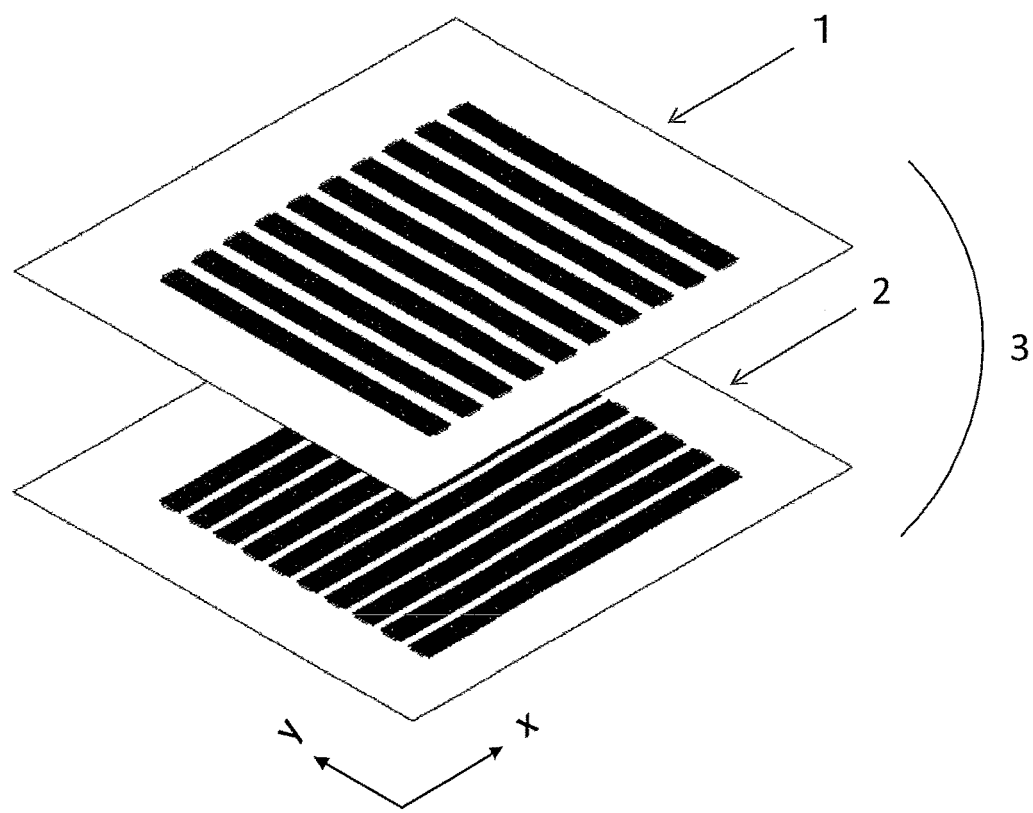
FIG. 1 is a schematic view of a positional relationship between an upper conductive layer and a lower conductive layer constituting the optically transparent conductive material of the present invention.

FIG. 1 is a schematic view of a positional relationship between an upper conductive layer and a lower conductive layer constituting the optically transparent conductive material of the present invention. For the sake of description, the upper conductive layer and the lower conductive layer are illustrated with a space therebetween; however, the upper conductive layer and the lower conductive layer are stacked with an insulation layer therebetween. In addition, the upper conductive layer and the lower conductive layer are each formed in a net-like pattern of metal thin wires, and are thus optically transparent. Yet, for the sake of convenience, the region of each sensor part of each layer is schematically shown with a black strip.

The optically transparent conductive material of the present invention may be one in which the optically transparent support is an insulation layer, the upper conductive layer is disposed on one side of the insulation layer, and the lower conductive layer is disposed on the other side thereof. Alternatively, as shown in FIG. 1, the upper conductive layer and the lower conductive layer may be disposed on separate optically transparent supports, and a non-conductive layer side of the optically transparent support with an upper conductive layer 1 and a conductive layer side of the optically transparent support with a lower conductive layer 2 may be bonded together with an optical clear adhesive (OCA) (in this case, the insulation layer is formed with the optically transparent support of the upper conductive layer 1 and the OCA) to provide an optically transparent conductive material 3 of the present invention. Still alternatively, the conductive layers may be bonded together with an OCA in such a manner that these layers face each other (in this case, the insulation layer is formed with the OCA alone). In FIG. 1, an OCA and components other than the sensor parts (such as dummy parts, wiring parts, and terminal areas) of the upper conductive layer 1 and the lower conductive layer 2 are omitted.

Figure 2:
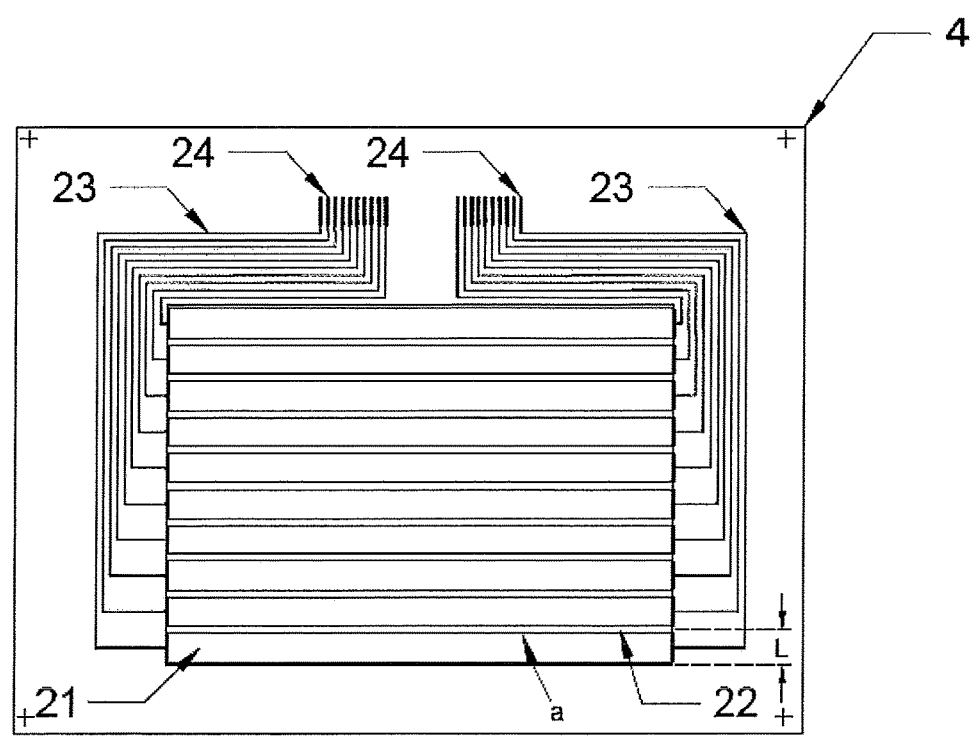
FIG. 2 is a schematic view of an exemplary lower conductive layer of the present invention.

FIG. 2 is a schematic view of an exemplary lower conductive layer of the present invention. In FIG. 2, the lower conductive layer includes the following components on an optically transparent support 4: sensor parts 21 and dummy parts 22 each formed in a net-like pattern of metal thin wires; peripheral wiring parts 23; and terminal areas 24. Here, the sensor parts 21 and the dummy parts 22 are formed in irregular net-like patterns of metal thin wires. However, for the sake of convenience, the ranges of these components are shown with imaginary outlines a (imaginary lines).

The sensor parts 21 are electrically connected to the terminal areas 24 via the peripheral wiring parts 23. As the sensor parts 21 are electrically connected to the outside via the terminal areas 24, changes in the capacitance sensed by the sensor parts 21 can be captured. Meanwhile, disconnection parts are provided at intersections between the imaginary outlines "a" and the metal thin wires to form the dummy parts 22 that cut off conduction from the terminal areas 24. In the present invention, all the irregular net-like patterns of metal thin wires without electrical connection to the terminal areas 24 are the dummy parts 22. In the present invention, the peripheral wiring parts 23 and the terminal areas 24 are not particularly required to be optically transparent, and thus each may be formed in a solid pattern (solid metal pattern without optical transparency) or may be formed in an optical transparent net-like pattern of metal thin wires as in the sensor parts 21 or the dummy parts 22.

In FIG. 2, the sensor parts 21 of the lower conductive layer consist of linear electrode (lower linear electrodes) extending in a first direction (x-direction in the figure) in the conductive layer plane. As shown in FIG. 2, the lower linear electrodes are repetitively aligned with a constant period L in a second direction (y-direction in the figure) perpendicular to the first direction, with the dummy part 22 between each lower linear electrode. The period L of the sensor parts 21 can be set to any length within a range that the resolution of the touch sensor is maintained. The linear electrodes of the sensor parts 21 may be formed with a constant width as shown in FIG. 2, or may be formed in a pattern with a period in the first direction (x-direction) (e.g., a design referred to as a diamond pattern in which rhombuses are connected with a constant period). The width of each linear electrode of the sensor parts 21 can also be set to any width within a range that the resolution of the touch sensor is maintained. The shape and width of the dummy parts 22 can also be set to any shape and width correspondingly.

As shown in FIG. 1, the upper conductive layer of the present invention is configured in the same manner as in the lower conductive layer described above, except that the linear electrodes of the sensor parts of the upper conductive layer are disposed to intersect the linear electrodes of the sensor parts of the lower conductive layer. In other words, the sensor parts of the upper conductive layer consist of linear electrodes (upper linear electrodes) extending in a third direction in the optically transparent conductive layer plane. The upper linear electrodes are repetitively aligned with a constant period M in a forth direction perpendicular to the third direction, with the dummy part between each upper linear electrode. The period M of the sensor parts can be set to any length within a range that the resolution of the touch sensor is maintained. The linear electrodes may be formed with a constant width, or may be formed in a pattern with a period in the third direction (e.g., the diamond pattern described above). The width of each linear electrode can also be set to any width within a range that the resolution of the touch sensor is maintained. The shape and width of the dummy parts can also be set to any shape and width correspondingly. In a view from a direction perpendicular to the conductive layer plane, the intersection angle between each upper linear electrode and each lower linear electrode (intersection angle between a centerline of each upper linear electrode and a centerline of each lower linear electrode, which will be described later) is most preferably 90 degrees as shown in FIG. 1 (in this case, the first direction coincides with the fourth direction, and the second direction coincides with the third direction). Yet, the angle may be set to any degree within the range of 60 degrees to 120 degrees. Further, any angle within the range of 45 degrees to 135 degrees may be used.

FIG. 3 is a schematic plan view of the optically transparent conductive material of the present invention including the upper conductive layer and the lower conductive layer in a stack, as viewed from a direction perpendicular to the conductive layer plane. In FIG. 3, details such as the pattern of metal thin wires of the dummy parts and the peripheral wiring parts are omitted, and the pattern of metal thin wires of the sensor parts and connection portions between the pattern of metal thin wires of the sensor parts and the peripheral wiring parts are shown. In FIG. 3, the sensor parts of the upper conductive layer include ten linear electrodes, and the sensor parts of the lower conductive layer include ten linear electrodes. Reception electrodes Rx1 to Rx10 correspond to the upper linear electrodes. Transmission electrodes Tx1 to Tx10 correspond to the lower linear electrodes. In FIG. 3, the centerlines of these linear electrodes perpendicularly intersect each other (the centerline of each upper linear electrode and the centerline of each lower linear electrode intersect each other at an angle of 90 degrees). The intersections between the reception electrodes Rx1 to Rx10 and the transmission electrodes Tx1 to Tx10 (portions where the net-like patterns of metal thin wires are superimposed on each other) each form a two-dimensional arrangement. There are 100 such intersections (10×10). In the case of a mutual capacitive touchscreen, when the intersections between the linear electrodes or the vicinity of the intersections are touched by the finger, changes in the capacitance at the intersections of the linear electrodes are detected, and information of the finger touch (contact) position is obtained from a two-dimensional coordinate. Although the upper linear electrodes may be used as the transmission electrodes Tx and the lower linear electrode may be used as the reception electrode Rx, in the description hereinafter, the lower linear electrodes are used as the transmission electrodes Tx and the upper linear electrodes are used as the reception electrodes Rx.

In the present invention, when the optically transparent conductive material including the upper conductive layer and the lower conductive layer in a stack is viewed from a direction perpendicular to the conductive layer plane, an intersection as a node between the centerline of each linear electrode of the upper conductive layer and the centerline of each linear electrode of the lower conductive layer is regarded as the center of gravity; and zones obtained by dividing the conductive layer plane into quadrangles by straight lines each obtained by shifting the centerline of each linear electrode of the lower conductive layer in the second direction by half the length equivalent to the period L and by straight lines each obtained by shifting the centerline of each linear electrode of the upper conductive layer in the fourth direction by half the length equivalent to the period M are regarded as node unit zones. When each linear electrode has a different width, a straight line that is parallel to the direction in which the linear electrode extends and that bisects the area of the region of the linear electrode is regarded as the centerline of the linear electrode.

FIG. 4 is a view for describing node unit zones of the present invention, and is an enlarged view of an upper left portion in FIG. 3. In the node unit zone, an intersection 411 between a centerline 41 of each linear electrode of the lower conductive layer and a centerline 42 of each linear electrode of the upper conductive layer (in FIG. 4, only one intersection between the centerline of the transmission electrode Tx1 as the lower linear electrode and the centerline of the reception electrode Rx1 as the upper linear electrode is shown) is regarded as the center of gravity (the center of mass in the figure when the density is assumed to be constant). The node unit zones are zones divided into quadrangles by straight lines (boundary lines 43) each obtained by shifting the centerline 41 of each lower linear electrode in the second direction (in the direction of the period L) by half the length equivalent to the period L and by straight lines (boundary lines 44) each obtained by shifting the centerline 42 of each upper linear electrode in the fourth direction (in the direction of the period M) by half the length equivalent to the period M. In other words, in FIG. 4, the zones divided by the boundary lines 43 and the boundary lines 44 correspond to the node unit zones, and all the zones shown with A to I in FIG. 4 are node unit zones. As described above, since the quadrangle of the node unit zone is formed with two pairs of parallel sides with the same length, the quadrangle is a parallelogram in a broad sense, including squares, rectangles, and rhombuses. Thus, the intersection between the centerline of each linear electrode of the lower conductive layer and the centerline of each linear electrode of the upper conductive layer is the intersection of diagonals of each node unit zone of the lower conductive layer and the upper conductive layer.

Figure 5:
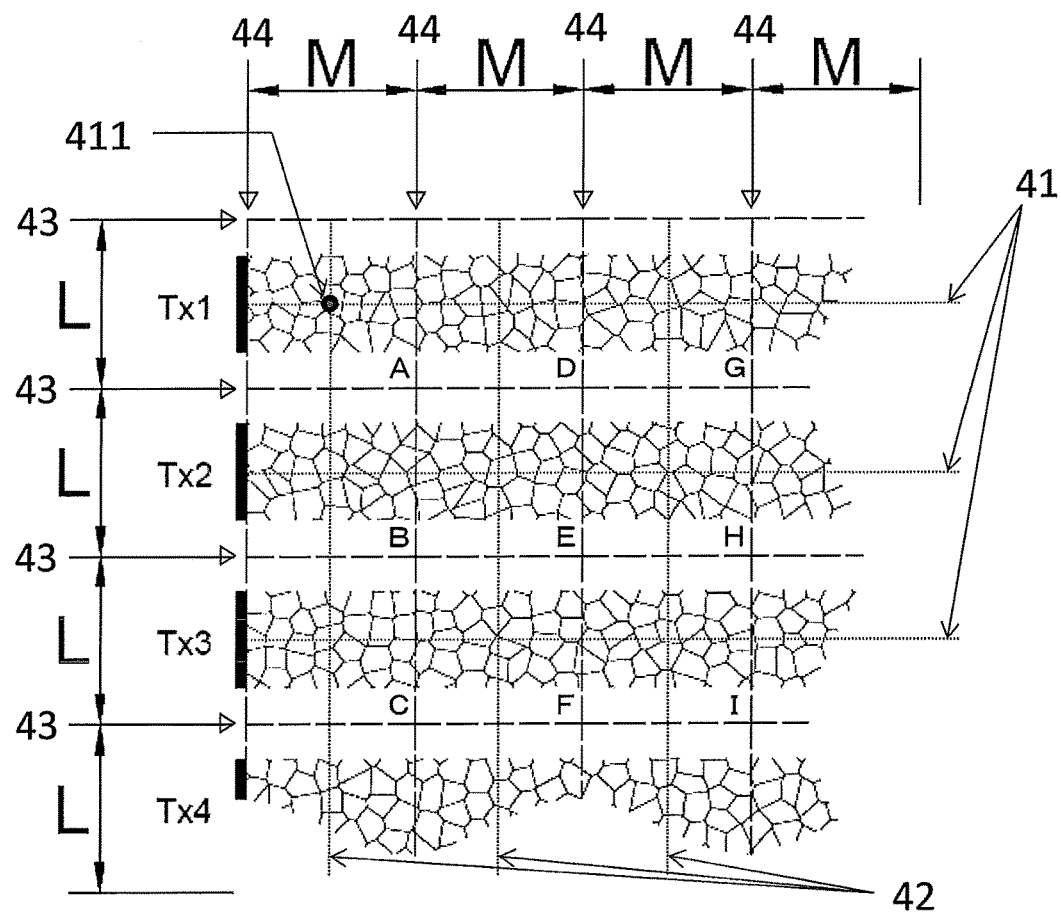
FIG. 5 is a view of an exemplary pattern of metal thin wires of sensor parts of the lower conductive layer.

FIG. 5 is a view of an exemplary pattern of metal thin wires of the sensor parts of the lower conductive layer. FIG. 5 shows the optically transparent conductive material shown in FIG. 4 with the upper conductive layer and transmission electrodes omitted therefrom. In FIG. 5, there are two zones, Zone B and Zone D, that each share a side of a quadrangle of Zone A that is a node unit zone located at a corner portion of the conductive layer as a whole. These Zone B and Zone D are adjacent node unit zones of Zone A. There are three zones, Zone A, Zone C, and Zone E, that each share a side of a quadrangle of Zone B that is a node unit zone located at a side portion of the conductive layer as a whole. These Zone A, Zone C, and Zone E are adjacent node unit zones of Zone B. There are four zones, Zone B, Zone D, Zone F, and Zone H, that each share a side of a quadrangle of Zone E that is a node unit zone located at an inner portion of the conductive layer as a whole. These Zone B, Zone D, Zone F, and Zone H are adjacent node unit zones of Zone E.

Next, irregular patterns of metal thin wires forming the sensor parts and the dummy parts in the present invention are described. The sensor parts and the dummy parts of the upper conductive layer and the lower conductive layer described above are each formed in an irregular net-like pattern of metal thin wires. Examples of the irregular net-like pattern include those obtained with irregular geometric shapes typified by, for example, a Voronoi diagram, a Delaunay diagram, and a Penrose tiling pattern. In the present invention, a net-like pattern formed with Voronoi edges based on generators (hereinafter referred to as a "Voronoi diagram") is preferably used. A net-like pattern obtained by unidirectionally stretching the Voronoi diagram is also preferably used. With the use of the Voronoi diagram or a net-like pattern obtained by unidirectionally stretching the Voronoi diagram, it is possible to obtain an optically transparent conductive material that can be used to provide a touchscreen with excellent visibility. The Voronoi diagram is a known diagram that has been applied in various fields including the field of information processing. FIG. 6 is a view for describing a Voronoi diagram. In FIG. 6 (6-a), when multiple generators 611 are arranged on a plane 60, the plane 60 is divided by boundary lines 62 in such a manner that a region 61 closest to an arbitrary selected generator 611 is separated from other regions 61 each closest to a different generator 611. The boundary lines 62 each between two different regions 61 are called Voronoi edges. A Voronoi edge is a part of the perpendicular bisector of a straight line connecting an arbitrary selected generator to an adjacent generator. A diagram formed of a collection of Voronoi edges is referred to as a Voronoi diagram.

A method for arranging generators is described with reference to FIG. 6 (6-b). In the present invention, a method for dividing the plane 60 into polygons and randomly arranging the generators 611 in the divided sections is preferably used. Examples of the method for dividing the plane 60 include one described below.

First, the plane 60 is tiled using multiple polygons of a single kind or of two or more kinds (hereinafter, referred to as "original polygons"). Subsequently, in each original polygon, the center of gravity is connected by a straight line to each vertex of the original polygon, and a reduced polygon is produced using, as a vertex, a point at any ratio of the distance of the straight line from the center of gravity to each vertex of the original polygon. Then, the plane 60 is divided by these reduced polygons produced. After dividing the plane 60 as described above, generators are randomly arranged in the reduced polygons, with one generator in one reduced polygon. In FIG. 6 (6-b), the plane 60 is tiled using original polygons 63 that are squares. Subsequently, a center of gravity 64 of each original polygon 63 is connected by a straight line to each vertex of the original polygon 63, and a reduced polygon 65 is produced using, as a vertex, a point at 90% of the distance of the straight line from the center of gravity 64 to each vertex of the original polygon 63. Multiple reduced polygons 65 are produced by connecting these vertices. Lastly, generators 611 are randomly arranged in the reduced polygons 65, with one generator 611 in one reduced polygon 65.

In the present invention, in order to prevent "grains" that are produced when an irregular pattern is used, tiling using the original polygons 63 of a single shape and size as shown in FIG. 6 (6-b) is preferred. Here, the term "grains" refers to a phenomenon in which high-density portions and low-density portions appear specifically in a random diagram. In addition, when the center of gravity of each original polygon is connected by a straight line to each vertex of the original polygon, a point as a vertex of the reduced polygon is preferably at 10 to 90% of the distance of the straight line from the center of gravity to each vertex of the original polygon. If the distance is more than 90%, the phenomenon of grains may appear. If the distance is less than 10%, a pattern with highly repetitive regularity may appear in the Voronoi diagram, causing moire when the optically transparent conductive material is superimposed on a liquid crystal display.

Preferred shapes of the original polygon are quadrangles (such as squares, rectangles, and rhombuses), triangles, and hexagons. In order to prevent the phenomenon of grains, more preferred are quadrangles, and particularly preferred are rectangles and squares each having a longer side to shorter side ratio of 1:0.8 to 1:1. The length of one side of the original polygon is preferably 100 to 2000 µm, more preferably 120 to 800 µm. In the present invention, the Voronoi edge is most preferably a straight line, but a different line such as a curved line, a wavy line, or a zigzag line may also be used.

In the present invention, in the case where in each node unit zone, a quadrangle whose diagonal length is 80% of the diagonal length of the node unit zone is regarded as a reduced quadrangle A; and in each adjacent node unit zone, a quadrangle whose diagonal length is 80% of the diagonal length of the adjacent node unit zone is regarded as a reduced quadrangle B, in each of the upper conductive layer and the lower conductive layer, the net-like pattern of metal thin wires in the reduced quadrangle A is not the same as the net-like pattern of metal thin wires in the reduced quadrangle B, and the total metal thin wire length in the reduced quadrangle A is 95 to 105% of the total metal thin wire length in the reduced quadrangle B.

Figure 7:
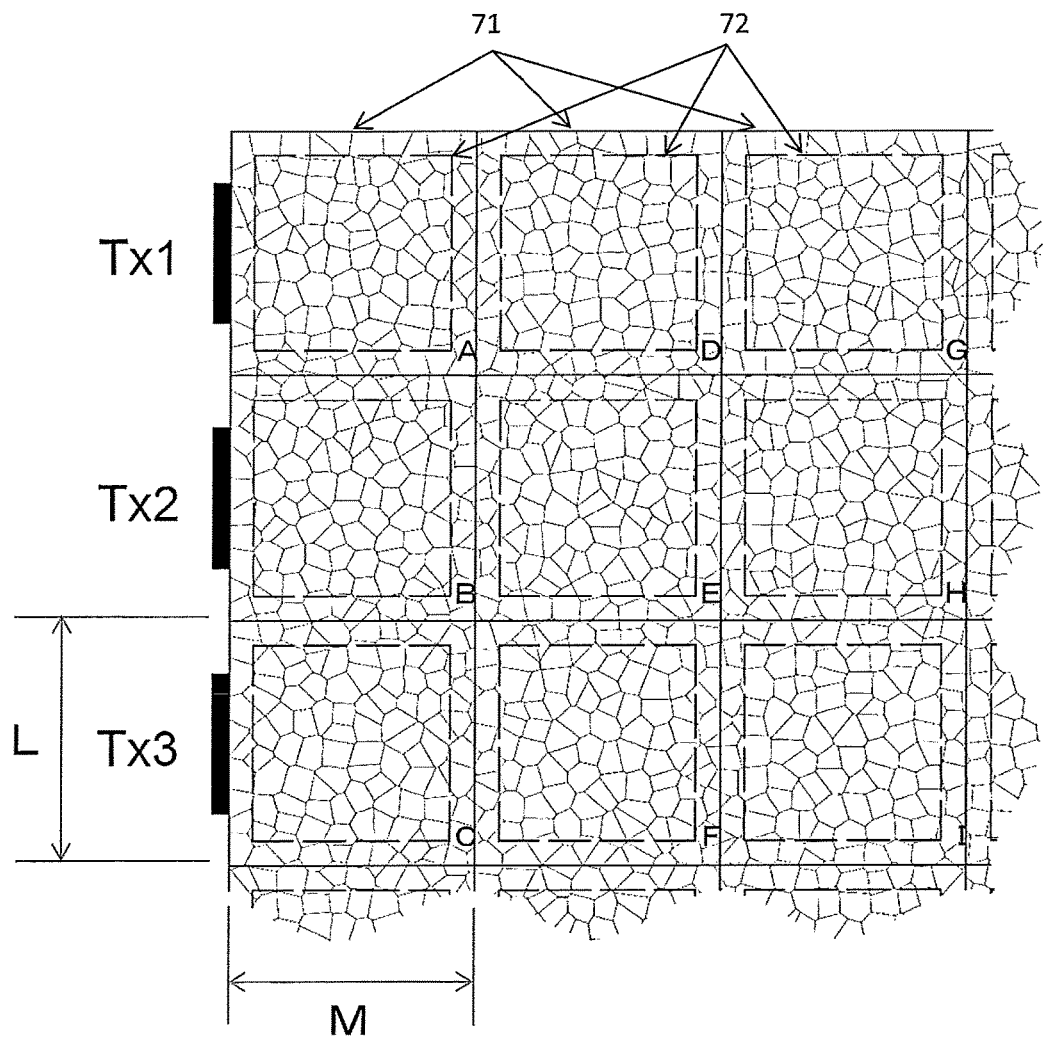
FIG. 7 is a view for describing node unit zones and reduced quadrangles in the lower conductive layer.

FIG. 7 is a view for describing the node unit zones and the reduced quadrangles in the lower conductive layer. Although not shown, the centerline of each upper linear electrode perpendicularly intersects the centerline of each lower linear electrode. FIG. 7 shows an exemplary net-like pattern of metal thin wires of the lower conductive layer, including the sensor parts in the form of the linear electrodes and the dummy parts each disposed between the linear electrodes. In FIG. 7, each zone 71 is a node unit zone. As described above, the zones 71 are zones divided into quadrangles by straight lines each obtained by shifting the centerline of each lower linear electrode in the second direction (y-direction in the figure) by half the length equivalent to the period L and by straight lines each obtained by shifting the centerline of each upper linear electrode in the fourth direction (x-direction in the figure) by half the length equivalent to the period M, with an intersection between the centerline of each lower linear electrode and the centerline of each upper linear electrode as the center of gravity. Each reduced quadrangle 72 is a reduced quadrangle whose diagonal length is 80% of the diagonal length of the node unit zone 71 and whose center of gravity is the same as that of the node unit zone 71. In the present invention, the reduced quadrangle preferably has the same center of gravity as the node unit zone.

In the present invention, in each of the upper conductive layer and the lower conductive layer, the net-like pattern of metal thin wires in the reduced quadrangle A in an arbitrary selected node unit zone is not the same as the net-like pattern of metal thin wires in the reduced quadrangle B in its adjacent node unit zone (there are two to four adjacent node unit zones). Thus, the occurrence of moire and pattern irregularity is prevented even when the optically transparent conductive material is superimposed on a liquid crystal display. Further, the total metal thin wire length of the net-like pattern in the reduced quadrangle A in a node unit zone is 95 to 105% of the total metal thin wire length in the reduced quadrangle B in its adjacent node unit zone (there are two to four adjacent node unit zones). Thus, variations in the capacitance at each node position are reduced, making it possible to obtain an optically transparent conductive material that can be used to provide a touchscreen with excellent detection sensitivity. The total metal thin wire length in the reduced quadrangle A is preferably 97.5 to 102.5% of the total metal thin wire length in the reduced quadrangle B because variations in the capacitance at each node position can be further reduced. When the total metal thin wire length of the net-like patterns in the reduced quadrangle A is less than 95% of the total metal thin wire length in the reduced quadrangle B in its adjacent node unit zone, variations in the capacitance cannot be sufficiently reduced. In addition, also when the total metal thin wire length of the net-like pattern in the reduced quadrangle A in a node unit zone is more than 105% of the total metal thin wire length in the reduced quadrangle B in its adjacent node unit zone sharing a side of a quadrangle of the node unit zone, variations in the capacitance cannot be sufficiently reduced.

As described above, in the case of a mutual capacitive touchscreen, changes in the capacitance at the intersections of the linear electrodes are detected, and information of the finger touch (contact) position is obtained from a two-dimensional coordinate. In the conductive material formed with random metal thin wires, the capacitance is affected by the pattern design of metal thin wires in the node unit zone including dummy parts. In particular, the capacitance is significantly affected by the pattern of metal thin wires present in a region that is 80% of the distance from the intersection between the centerlines of the linear electrodes to the outer edge of the node unit zone. In the present invention, particularly, the pattern of metal thin wires of this region is formed in design with specific conditions. Thus, when the present invention is applied to a touchscreen, the touchscreen can suppress variations in the capacitance and provide high detection sensitivity. In other words, the present inventors found that when the pattern of metal thin wires is formed with metal thin wires substantially having the same wire width, it is possible to reduce variations in the capacitance even when each node unit zone has a different, irregular pattern of metal thin wires by controlling the total metal thin wire length in each node unit zone. In addition, some detection circuits may monitor the difference in the capacitance between each node unit zone and its adjacent node unit zone as a measure against noise, and a contact position of a finger may be detected from changes in the difference. In this case, variations in the difference in the capacitance between each node unit zone and its adjacent node unit zone may present a problem more so than variations in the difference between the capacitance of each node unit zone and the average capacitance of all the node unit zones. The present invention can also suppress such variations in the difference, thus providing high detection sensitivity.

As an exemplary method for producing a pattern of metal thin wires in the reduced quadrangle with the total metal thin wire length controlled, the following procedure may be mentioned. The lengths of sides (L and M) of a quadrangle of each node unit zone (or each adjacent node unit zone) shown in FIG. 4 are respectively divided by any integers equal to or greater than 10 (n1 and n2) to obtain lengths (L/n1 and M/n2) as sides of a quadrangle as an original polygon to produce a Voronoi diagram. In the case where the entire view shown in FIG. 6 (6-b) described above is a single node unit zone, the view shown in FIG. 6 (6-b) is considered to be an example where n1=n2=10. FIG. 8 is a view for describing how to determine the thin wires length in the reduced quadrangle when the view shown in FIG. 6 (6-b) is regarded as a node unit zone (hereinafter, the thin wires are also referred to as "segments" when mentioned for a manuscript for a pattern exposure mask used to produce the thin wires). In FIG. 8 (8-a), a reduced quadrangle 83 has the same center of gravity 82 with a quadrangle 81 that is a node unit zone. A diagonal length 85 of the reduced quadrangle 83 is 80% of a diagonal length 84 of the quadrangle 81 that is a node unit zone. FIG. 8 (8-b) only shows a Voronoi diagram in the reduced quadrangle 83 shown in FIG. 8 (8-a). The total segment length in this view is measured. The measurement can be easily performed on a computer, using functions of CAD software. The total thin wire length in disconnection parts (located at metal thin wire portions where dotted lines 86, i.e; previously mentioned imaginary outlines a, indicating the boundaries between the sensor parts and the dummy parts intersect each other) disposed at the boundaries between the sensor parts and the dummy parts in the view is deducted from the measured value. If disconnection parts are disposed in the dummy parts, the total thin wire length in these dummy parts is also deducted from the measured value. The operation from setting random generators in the node unit zones up to deducting is repeated at least the number of times required for the later-described operation, thus obtaining multiple sets of data regarding generator groups in the node unit zones and the total segment length in the reduced quadrangle of a Voronoi diagram produced based on the generator groups. The total segment length is different depending on the position of each of the generators randomly disposed. Thus, basically, the total segment length is different for each generator group.

Next, the values of the total segment length in multiple reduced quadrangles determined by the procedure described above are used to determine a combination of generator groups in the node unit zones with which the total segment length in the reduced quadrangle in one node unit zone is 95 to 105% of the total segment length in the reduced quadrangle in its adjacent node unit zone. Such a combination is selected to determine an arrangement of generators at each node position on the entire conductive layer. For example, in the case of FIG. 3 described above, in each of the upper conductive layer and the lower conductive layer, a combination that satisfies the above condition is selected for each of 100 node unit zones. Here, a generator group in one node unit zone can be repeatedly selected. However, as described later, if the same generator group is selected for the adjacent node position, the Voronoi diagram in the reduced quadrangle in the node unit zone will be basically the same as the Voronoi diagram in the reduced quadrangle in the adjacent node unit zone, so that pattern irregularity will likely occur. Thus, in the present invention, in order to ensure that the net-like pattern of metal thin wires in the reduced quadrangle in an arbitrary selected node unit zone is different from the net-like pattern of metal thin wires in the reduced quadrangle in its adjacent node unit zone, a different generator group is arranged at the adjacent node position. Next, the generator groups arranged according to the determined combinations are used again as generators to obtain the sensor parts/dummy parts of the conductive layer as a whole (for example, as generators to obtain the reception electrodes Rx1 to Rx10 of the upper conductive layer and the dummy parts disposed therebetween, or as generators to obtain the transmission electrodes Tx1 to Tx10 of the lower conductive layer and the dummy parts disposed therebetween, as shown in FIG. 3 described above) so as to reproduce a Voronoi diagram.

Figure 9:
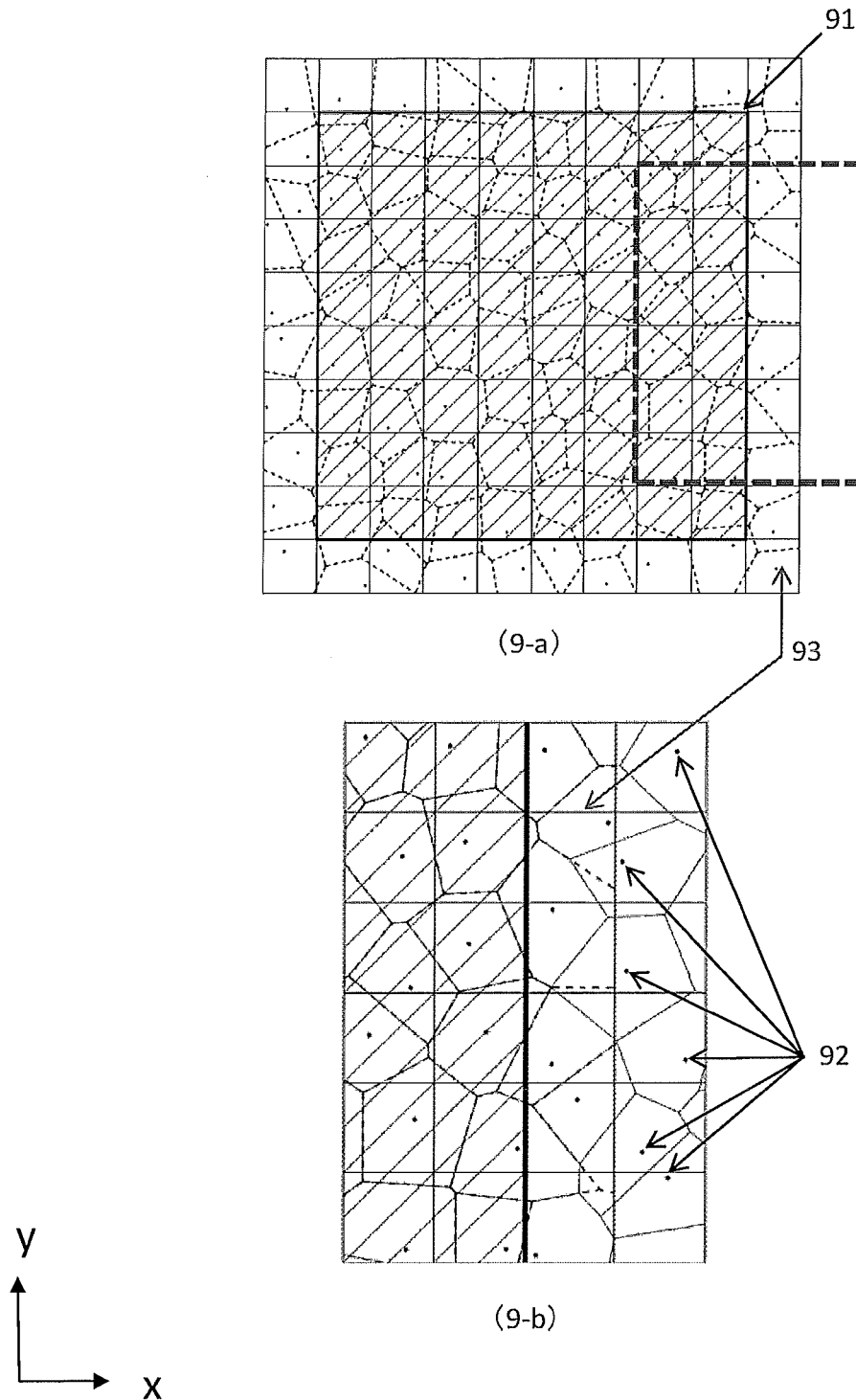
FIG. 9 is a schematic view of a method for reproducing a Voronoi diagram.

According to the above procedure, a Voronoi diagram is produced for each of the sensor parts and the dummy parts. Reproduction of a Voronoi diagram does not basically change the segment length in each reduced quadrangle as measured in advance for each node unit zone alone. The following description is provided in this regard with reference to FIG. 9. FIG. 9 is a schematic view of a method for reproducing a Voronoi diagram. FIG. 9 (9-*a*) shows a Voronoi diagram in dotted lines in a single node unit zone alone. In this state, the total segment length in a reduced quadrangle 91 is measured. FIG. 9 (9-*b*) shows an enlarged view of a portion in a dotted box in FIG. 9 (9-*a*), after a different generator group is added to an adjacent node unit zone on the right side in FIG. 9 (9-*a*) to produce a Voronoi diagram. In FIG. 9 (9-*b*), dotted lines show Voronoi edges of a Voronoi diagram produced only using the generator group shown in FIG. 9 (9-*a*), and solid lines show Voronoi edges of a Voronoi diagram reproduced after adding a different generator group 92 to the adjacent node unit zone on the right side in FIG. 9 (9-*a*).

In FIG. 9 (9-*b*), the Voronoi edges in original polygons 93 (polygons without hatched lines) located at the outermost of the node unit zone are partially different from the Voronoi edges (dotted lines) produced in the node unit zone alone shown in FIG. 9 (9-*a*). However, the Voronoi edges in the reduced quadrangle in hatched lines (in the reduced quadrangle A whose diagonal length is 80% of the diagonal length of the node unit zone) remain the same because these edges are not affected by the generators in the adjacent node unit zone. In other words, the Voronoi diagram in the reduced quadrangle in the final pattern is the same as the Voronoi diagram in the reduced quadrangle at the time of production of the generator groups described above (at the time of measurement of the segment length). Thus, the total segment length in the reduced quadrangles is maintained in the final pattern.

In the present invention, the sensor parts 21 and the dummy parts 22 are each formed in a net-like pattern of metal thin wires. Preferred examples of the metal include gold, silver, copper, nickel, aluminium, and composite materials thereof. Peripheral wiring parts 24 and terminal areas 25 are preferably made of the same metal composition as that of the sensor parts 21 and the dummy parts 22 in terms of production efficiency. Examples of the method for forming these metal patterns include known methods such as a method in which a silver halide photography photosensitive material is used; a method in which a silver image (silver wiring pattern) obtained using a silver halide photography photosensitive material is electroless plated or electroplated; a method in which conductive ink such as silver paste or copper paste is printed by a screen printing method; a method in which conductive ink such as silver ink or copper ink is printed by an ink-jet method; a method in which a conductive layer is formed by vapor deposition or sputtering, and a resistance film is formed thereon, followed by exposure, development, and etching in a sequential manner, and then resist layer removal; and a method in which metal foil such as copper foil is attached, and a resistance film is formed thereon, followed by exposure, development, and etching in a sequential manner, and then resist layer removal. Particularly preferred is a silver salt diffusion transfer process because the pattern of metal thin wires to be produced can be made thin and a very fine pattern can be easily formed with this process.

The wire width of the pattern of metal thin wires produced by any of the above techniques is preferably the same in the sensor parts and the dummy parts in one conductive layer. In terms of achieving both the conductivity and the optical transparency, the wire width is preferably 1 to 20 μm, more preferably 2 to 7 μm.

As for the thickness of the pattern of metal thin wires, a pattern that is too thick may be difficult to post-process (e.g., bonding to other members). A pattern that is too thin may not be able to provide necessary conductivity to a touchscreen. Thus, the thickness is preferably 0.01 to 5 μm, more preferably 0.05 to 1 μm.

The optical transparency of the optically transparent conductive material of the present invention means that the total light transmittance of the sensor parts and the dummy parts is 60% or more. The total light transmittance of the sensor parts and the dummy parts is preferably 80% or more, more preferably 82.5% or more, particularly preferably 85% or more. In addition, the difference between the total light transmittance of the sensor parts and the total light transmittance of the dummy parts is preferably within 0.5%, more preferably within 0.1%, particularly preferably 0%. In the optically transparent conductive material of the present invention, the haze value of each of the sensor parts and the dummy parts is preferably 2 or less. Further, as for the hue of the sensor parts and the dummy parts, the value of b* in CIELAB space is preferably 2 or less, more preferably 1 or less.

The optically transparent support of the optically transparent conductive material of the present invention is preferably an optically transparent support formed from a known insulating material such as glass, polyester resins such as polyethylene terephthalate (PET) and polyethylene naphthalate (PEN), acrylic resin, epoxy resin, fluororesin, silicone resin, polycarbonate resin, diacetate resin, triacetate resin, polyarylate resin, polyvinyl chloride, polysulfone resin, polyether sulfone resin, polyimide resin, polyamide resin, polyolefin resin, and cyclic polyolefin resin. The term "optical transparency" as used herein means that the total light transmittance is 60% or higher. The total light transmittance is preferably 80% or higher. The thickness of the optically transparent support is preferably in the range of 50 μm to 5 mm. In addition, the optically transparent support may also include a known layer, such as an anti-fingerprint layer, a hard coat layer, an antireflection layer, and an antiglare layer.

In the present invention, an OCA is used to bond the optically transparent support side of the upper conductive layer 1 and the conductive layer side of the lower conductive layer 2 together as shown in FIG. 1 or to bond the conductive layers together in such a manner that these layers face each other. The OCA is preferably a known insulating adhesive, such as a rubber-based adhesive, an acrylic adhesive, a silicone-based adhesive, or a urethane-based adhesive, which becomes optically transparent after bonding.

EXAMPLES

The present invention is described in details with reference to examples below, but the present invention is not limited to the following examples as long as modifications are within the scope of the present invention.

<Preparation of Lower Conductive Layer 1>

The optically transparent support was a 100-μm-thick polyethylene terephthalate film. This optically transparent support had a total light transmittance of 92%.

Next, in accordance with the following formulation, a physical development nuclei layer coating liquid was prepared, applied to the optically transparent support, and dried to form a physical development nuclei layer.

<Preparation of Palladium Sulfide Sol>

| Liquid A | |
|---|---|
| Palladium chloride | 5 g |
| Hydrochloric acid | 40 ml |
| Distilled water | 1000 ml |

-continued

| Liquid B | |
|---|---|
| Sodium sulfide | 8.6 g |
| Distilled water | 1000 ml |

Liquid A and Liquid B were mixed with stirring for 30 minutes, and then passed through a column filled with an ion exchange resin to give a palladium sulfide sol.
<Composition of Physical Development Nuclei Layer Coating Liquid> Amount Per m² of Silver Halide Photosensitive Material

| | |
|---|---|
| Palladium sulfide sol prepared above | 0.4 mg |
| 2% (by mass) aqueous glyoxal solution | 0.2 ml |
| Surfactant represented by formula (1) below | 4 mg |
| Denacol EX-830 (polyethylene glycol diglycidyl ether available from Nagase ChemteX Corporation) | 50 mg |
| 10% (by mass) aqueous SP-200 solution (polyethylenimine available from Nippon Shokubai Co., Ltd.; average molecular weight of 10,000) | 0.5 mg |

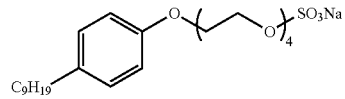

(1)

Subsequently, coating liquids were applied to the physical development nuclei layer to form an intermediate layer, a silver halide emulsion layer, and a protective layer, of which the compositions are shown below, in this order from closest to the optically transparent support, followed by drying to give a silver halide photosensitive material. The silver halide emulsion was produced by a common double jet mixing method for photographic silver halide emulsions. Silver halide grains of the silver halide emulsion were prepared from 95% by mol of silver chloride and 5% by mol of silver bromide to have an average particle diameter of 0.15 μm. The silver halide emulsion obtained as above was subjected to gold and sulfur sensitization using sodium thiosulfate and chloroauric acid by the usual method. The silver halide emulsion obtained as above contained 0.5 g of gelatin per gram of silver.

<Composition of Intermediate Layer> Amount Per m² of Silver Halide Photosensitive Material

| | |
|---|---|
| Gelatin | 0.5 g |
| Surfactant represented by formula (1) above | 5 mg |
| Dye represented by formula (2) below | 5 mg |

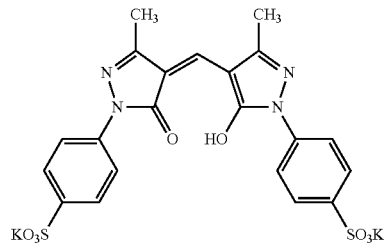

(2)

<Composition of Silver Halide Emulsion Layer> Amount Per m² of Silver Halide Photosensitive Material

| | |
|---|---|
| Gelatin | 0.5 g |
| Silver halide emulsion | 3.0 g in silver equivalent |
| 1-Phenyl-5-mercaptotetrazole | 3 mg |
| Surfactant represented by formula (1) above | 20 mg |

<Composition of Protective Layer> Amount Per m² of Silver Halide Photosensitive Material

| | |
|---|---|
| Gelatin | 1 g |
| Amorphous silica matting agent (average particle size of 3.5 μm) | 10 mg |
| Surfactant represented by formula (1) above | 10 mg |

The silver halide photosensitive material obtained as above was brought into close contact with a transparent manuscript (lower) 1 having the pattern image shown in FIG. 2, and light exposure was performed, through a resin filter which cuts off light of 400 nm or less, using a contact printer having a mercury lamp as a light source. In the transparent manuscript (lower) 1, the sensor parts 21 were repeated with the period L of 6.95 mm in the y-direction.

In the transparent manuscript (lower) 1 having the pattern image shown in FIG. 2, the pattern of metal thin wires of each of the sensor parts 21 and the dummy parts 22 was produced by the following procedure. A square with sides of 0.695 mm in length in an x-direction and a y-direction was used as an original polygon, and 10 such squares were arranged in each of the x-direction and the y-direction as shown in FIG. 6 (6-b) to fill the zones corresponding to the node unit zones generated by superimposition of the upper conductive layer and the lower conductive layer on each other. A Voronoi diagram was produced by randomly arranging one generator in each reduced polygon obtained by connecting points at 90% of the distance between the center of gravity and each vertex of the original polygon; separating a region closest to an arbitrary selected generator from other regions each closest to a different generator by outlines; and repeating this separation process for all the generators. Disconnection parts each having a width of 10 μm were formed at portions corresponding to the boundaries between the sensor parts and the dummy parts. Next, as shown in FIG. 8, the total segment length in each reduced quadrangle whose diagonal length was 80% of the diagonal length of the node unit zone was measured. The node unit zone and the reduced quadrangle have the same center of gravity. The above operation was repeated 16 times to obtain 16 Voronoi diagrams each having different net-like pattern. Table 1 shows the measurement results of the total segment length in the reduced quadrangle of each Voronoi diagram. From the measurement results of Table 1, Voronoi diagrams were selected such that the net-like pattern of each node unit zone is not the same as the net-like pattern of its adjacent node unit zone and that the total metal thin wire length in the reduced quadrangle A is 95 to 105% of the total length of the metal thin wires in the reduced quadrangle B, and the generators of these Voronoi diagrams were rearranged over the entire sensor parts/dummy parts (rearranged as generators to obtain the transmission electrodes Tx1 to Tx10 of the lower conductive layer and the dummy parts disposed therebetween, as shown in FIG. 3).

TABLE 1

| Voronoi diagram | Total segment length in reduced quadrangle (mm) |
|---|---|
| 1 | 88.6 |
| 2 | 86.7 |
| 3 | 87.8 |
| 4 | 89.0 |
| 5 | 87.2 |
| 6 | 87.1 |
| 7 | 85.8 |
| 8 | 87.9 |

TABLE 1-continued

| Voronoi diagram | Total segment length in reduced quadrangle (mm) |
|---|---|
| 9 | 85.2 |
| 10 | 87.0 |
| 11 | 88.2 |
| 12 | 89.3 |
| 13 | 87.7 |
| 14 | 86.1 |
| 15 | 90.1 |
| 16 | 88.6 |

Voronoi diagrams were produced based on the generators arranged over the entire sensor parts/dummy parts. In the Voronoi diagrams, the wire width was 5 µm in the sensor parts and the dummy parts, and disconnection parts each having a length of 10 µm were formed at the boundaries between the sensor parts and the dummy parts. Table 2 shows an arrangement of the Voronoi diagrams (generators used to produce the Voronoi diagrams) produced above in the transparent manuscript (lower) 1 used for the lower conductive layer 1. According to Table 2, a Voronoi diagram is arranged in each of 10×10 regions, and the number in each region corresponds to the Voronoi diagram number (1 to 16) shown in Table 1. In Table 2, in order to establish a corresponding relationship between the arrangement positions of the Voronoi diagrams and the transmission electrode positions, corresponding transmission electrode positions are regarded as Tx1 to Tx10. Further, the reception electrode positions on the opposing upper conductive layer are regarded as Rx1 to Rx10 (parentheses are used because these electrodes are not included in the lower conductive layer). The transparent manuscript (lower) 1 is a transparent manuscript having a pattern shown in FIG. 2 with sensor parts in which 10 linear electrodes extending in the x-direction are repetitively aligned in the y-direction with the period L. The period L in the sensor parts is 6.95 mm. In addition, FIG. 10 shows, in the center of each node unit zone, the total segment length (mm) of the reduced quadrangle in the node unit zone. Also, the ratio (%) of the total segment length in the reduced quadrangle in the node unit zone to the total segment length in the reduced quadrangle in its adjacent node unit zone sharing a side in each direction is shown around the total segment length, on a side corresponding to the direction of the shared side. FIG. 10 also shows the reception electrode positions and their corresponding transmission electrode positions, as in Table 2.

A pattern of the transparent manuscript (lower) 1 was produced by the procedure described above.

TABLE 2

|  | (Rx1) | (Rx2) | (Rx3) | (Rx4) | (Rx5) | (Rx6) | (Rx7) | (Rx8) | (Rx9) | (Rx10) |
|---|---|---|---|---|---|---|---|---|---|---|
| Tx1 | 13 | 14 | 15 | 16 | 6 | 11 | 16 | 2 | 4 | 2 |
| Tx2 | 9 | 10 | 11 | 12 | 7 | 15 | 11 | 16 | 15 | 7 |
| Tx3 | 5 | 6 | 7 | 8 | 12 | 4 | 7 | 15 | 10 | 13 |
| Tx4 | 1 | 2 | 3 | 4 | 6 | 14 | 16 | 10 | 7 | 3 |
| Tx5 | 16 | 8 | 16 | 9 | 16 | 2 | 15 | 5 | 1 | 10 |
| Tx6 | 10 | 5 | 11 | 7 | 6 | 1 | 11 | 15 | 5 | 9 |
| Tx7 | 1 | 8 | 5 | 13 | 9 | 10 | 12 | 14 | 2 | 10 |
| Tx8 | 4 | 2 | 1 | 15 | 8 | 1 | 7 | 13 | 8 | 6 |
| Tx9 | 8 | 16 | 14 | 5 | 7 | 11 | 5 | 3 | 12 | 2 |
| Tx10 | 6 | 4 | 7 | 4 | 15 | 1 | 3 | 15 | 6 | 9 |

After immersion in the diffusion transfer developer shown below at 20° C. for 60 seconds, the silver halide emulsion layer, the intermediate layer, and the protective layer were washed off with warm water at 40° C. and dried. Through the process described above, the lower conductive layer 1 having the pattern of metal wires (hereinafter also referred to as the "metal silver image") shown in FIG. 2 was obtained. The metal silver image of the lower conductive layer 1 obtained had the same pattern and the same line width as those of the transparent manuscript (lower) 1 having the pattern shown in FIG. 2. The film thickness of the metal silver image was 0.1 µm as measured with a confocal microscope.

<Composition of Diffusion Transfer Developer>

| Potassium hydroxide | 25 g |
|---|---|
| Hydroquinone | 18 g |
| 1-Phenyl-3-pyrazolidone | 2 g |
| Potassium sulfite | 80 g |
| N-methylethanolamine | 15 g |
| Potassium bromide | 1.2 g |

The total volume was made up to 1000 ml with water. The pH of the diffusion transfer developer was 12.2.

<Preparation of Upper Conductive Layer 1>

A pattern of a transparent manuscript (upper) 1 to be used to produce the upper conductive layer 1 was produced in the same manner as in the lower conductive layer 1 such that the centerline of each linear electrode perpendicularly intersects the centerline of each linear electrode of the lower conductive layer in a view from a direction perpendicular to the conductive layer plane when the upper conductive layer 1 is used in an optically transparent conductive material, except that Voronoi diagrams shown in Table 3 were used instead of the Voronoi diagrams shown in Table 1 and an arrangement of Voronoi diagrams shown in Table 4 was used instead of the arrangement shown in Table 2. The numbers shown in Table 4 correspond to the Voronoi diagram numbers (17 to 32) shown in Table 3. In Table 4, in order to establish a corresponding relationship between the arrangement positions of the Voronoi diagrams and the reception electrode positions, corresponding reception electrode positions are regarded as Rx1 to Rx10. Further, the transmission electrode positions on the opposing lower conductive layer are regarded as Tx1 to Tx10 (parentheses are used because these electrodes are not included in the upper conductive layer). The transparent manuscript (upper) 1 is a transparent manuscript having a pattern shown in FIG. 2 with sensor parts in which 10 linear electrodes extending in the y-direction are repetitively aligned in the x-direction with the period M. The period M in the sensor parts is 6.95 mm. As in FIG. 10, FIG. 11 shows total segment lengths and ratios thereof in the reduced quadrangles in the transparent manuscript (upper) 1. The metal silver image of the upper conductive layer 1 obtained had the same pattern and the same line width as those of the transparent manuscript (upper) 1. The film thickness of the metal silver image was 0.1 μm as measured with a confocal microscope.

TABLE 3

| Voronoi diagram | Total segment length in reduced quadrangle (mm) |
| --- | --- |
| 17 | 89.4 |
| 18 | 89.3 |
| 19 | 88.2 |
| 20 | 88.3 |
| 21 | 88.9 |
| 22 | 87.5 |
| 23 | 88.0 |
| 24 | 86.5 |
| 25 | 87.5 |
| 26 | 86.7 |
| 27 | 87.1 |
| 28 | 85.2 |
| 29 | 89.9 |
| 30 | 89.3 |
| 31 | 89.7 |
| 32 | 87.5 |

TABLE 4

|  | Rx1 | Rx2 | Rx3 | Rx4 | Rx5 | Rx6 | Rx7 | Rx8 | Rx9 | Rx10 |
| --- | --- | --- | --- | --- | --- | --- | --- | --- | --- | --- |
| (Tx1) | 28 | 26 | 31 | 29 | 24 | 17 | 20 | 21 | 17 | 19 |
| (Tx2) | 30 | 32 | 17 | 24 | 18 | 27 | 22 | 17 | 31 | 23 |
| (Tx3) | 23 | 24 | 27 | 22 | 20 | 25 | 29 | 23 | 17 | 30 |
| (Tx4) | 28 | 23 | 28 | 27 | 24 | 23 | 24 | 26 | 27 | 18 |
| (Tx5) | 18 | 32 | 22 | 25 | 26 | 24 | 25 | 17 | 29 | 31 |
| (Tx6) | 21 | 20 | 30 | 22 | 18 | 19 | 22 | 28 | 30 | 26 |
| (Tx7) | 20 | 32 | 31 | 32 | 29 | 23 | 24 | 19 | 22 | 24 |
| (Tx8) | 27 | 21 | 26 | 21 | 20 | 24 | 25 | 28 | 32 | 19 |
| (Tx9) | 31 | 26 | 27 | 30 | 26 | 25 | 29 | 27 | 21 | 18 |
| (Tx10) | 20 | 19 | 30 | 32 | 17 | 24 | 27 | 17 | 30 | 24 |

Preparation of Optically Transparent Conductive Material 1 (Example 1)

The lower conductive layer 1 and the upper conductive layer 1 obtained as above and a 2-mm-thick polycarbonate plate (available form Mitsubishi Gas Chemical Company, Inc.;

hereinafter simply abbreviated as the "PC plate") were bonded using an OCA (MHN-FWD100 available from-Nichiei Kakoh Co., Ltd.) in the bonding order of the PC plate/OCA/the upper conductive layer 1/OCA/the lower conductive layer 1 such that each conductive layer surface is oriented toward the PC plate and that these layers are aligned with each other using alignment marks (+) on the four corners of each layer. Thus, the optically transparent conductive material 1 was produced. In the case of the optically transparent conductive material 1, in each of the upper conductive layer and the lower conductive layer, the total metal thin wire length in the reduced quadrangle A is 95 to 105% of the total metal thin wire length in the reduced quadrangle B. In the obtained optically transparent conductive material 1 and optically transparent conductive materials 2 to 8 obtained below, the total light transmittance was 85% or more in the sensor parts and the dummy parts.

<Preparation of Lower Conductive Layer 2>

A pattern of a transparent manuscript (lower) 2 to be used to produce the lower conductive layer 2 was produced in the same manner as in the lower conductive layer 1, except that an arrangement of Voronoi diagrams shown in Table 5 was used instead of the arrangement shown in Table 2. As in FIG. 10, FIG. 12 shows segment lengths and ratios thereof in the transparent manuscript (lower) 2. The metal silver image of the lower conductive layer 2 obtained had the same pattern and the same line width as those of the transparent manuscript (lower) 2. The film thickness of the metal silver image was 0.1 μm as measured with a confocal microscope.

TABLE 5

|  | (Rx1) | (Rx2) | (Rx3) | (Rx4) | (Rx5) | (Rx6) | (Rx7) | (Rx8) | (Rx9) | (Rx10) |
| --- | --- | --- | --- | --- | --- | --- | --- | --- | --- | --- |
| Tx1 | 5 | 10 | 4 | 16 | 6 | 12 | 16 | 15 | 1 | 13 |
| Tx2 | 9 | 14 | 8 | 1 | 2 | 1 | 13 | 16 | 11 | 14 |

TABLE 5-continued

|      | (Rx1) | (Rx2) | (Rx3) | (Rx4) | (Rx5) | (Rx6) | (Rx7) | (Rx8) | (Rx9) | (Rx10) |
|------|-------|-------|-------|-------|-------|-------|-------|-------|-------|--------|
| Tx3  | 2     | 6     | 7     | 8     | 13    | 8     | 14    | 13    | 14    | 5      |
| Tx4  | 1     | 12    | 3     | 11    | 6     | 13    | 5     | 14    | 7     | 3      |
| Tx5  | 13    | 8     | 16    | 2     | 16    | 10    | 4     | 13    | 2     | 14     |
| Tx6  | 12    | 15    | 8     | 7     | 6     | 1     | 12    | 4     | 5     | 9      |
| Tx7  | 1     | 8     | 5     | 13    | 7     | 2     | 11    | 10    | 2     | 14     |
| Tx8  | 11    | 15    | 1     | 4     | 13    | 11    | 14    | 5     | 8     | 6      |
| Tx9  | 8     | 16    | 10    | 5     | 14    | 2     | 5     | 3     | 1     | 2      |
| Tx10 | 6     | 8     | 2     | 1     | 11    | 1     | 3     | 4     | 6     | 9      |

<Preparation of Upper Conductive Layer 2>

A pattern of a transparent manuscript (upper) 2 to be used to produce the upper conductive layer 2 was produced in the same manner as in the upper conductive layer 1, except that an arrangement of Voronoi diagrams shown in Table 6 was used instead of the arrangement shown in Table 4. As in FIG. 10, FIG. 13 shows segment lengths and ratios thereof in the transparent manuscript (upper) 2. The metal silver image of the upper conductive layer 2 obtained had the same pattern and the same line width as those of the transparent manuscript (upper) 2. The film thickness of the metal silver image was 0.1 μm as measured with a confocal microscope.

TABLE 6

|        | Rx1 | Rx2 | Rx3 | Rx4 | Rx5 | Rx6 | Rx7 | Rx8 | Rx9 | Rx10 |
|--------|-----|-----|-----|-----|-----|-----|-----|-----|-----|------|
| (Tx1)  | 19  | 30  | 31  | 29  | 31  | 19  | 20  | 29  | 17  | 20   |
| (Tx2)  | 26  | 32  | 23  | 21  | 19  | 27  | 22  | 17  | 31  | 23   |
| (Tx3)  | 23  | 24  | 27  | 22  | 20  | 25  | 18  | 23  | 19  | 30   |
| (Tx4)  | 31  | 23  | 21  | 27  | 26  | 23  | 20  | 29  | 21  | 18   |
| (Tx5)  | 18  | 32  | 22  | 25  | 19  | 24  | 25  | 21  | 18  | 25   |
| (Tx6)  | 21  | 20  | 30  | 22  | 20  | 19  | 22  | 30  | 17  | 25   |
| (Tx7)  | 20  | 32  | 17  | 32  | 27  | 23  | 24  | 19  | 22  | 24   |
| (Tx8)  | 27  | 21  | 23  | 18  | 19  | 24  | 25  | 21  | 32  | 23   |
| (Tx9)  | 28  | 27  | 25  | 22  | 26  | 25  | 26  | 27  | 21  | 18   |
| (Tx10) | 24  | 19  | 26  | 27  | 28  | 24  | 28  | 24  | 20  | 17   |

Preparation of Optically Transparent Conductive Material 2 (Example 2)

The lower conductive layer 2 and the upper conductive layer 1 obtained as above and a 2-mm-thick PC plate were bonded using an OCA in the bonding order of the PC plate/OCA/the upper conductive layer 1/OCA/the lower conductive layer 2 such that each conductive layer surface is oriented toward the PC plate and that these layers are aligned with each other using alignment marks (+) on the four corners of each layer. Thus, the optically transparent conductive material 2 was produced. In the case of the optically transparent conductive material 2, in the upper conductive layer, the total metal thin wire length in the reduced quadrangle A is 95 to 105% of the total metal thin wire length in the reduced quadrangle B. In the lower conductive layer, the total metal thin wire length in the reduced quadrangle A is 97.5 to 102.5% of the total metal thin wire length in the reduced quadrangle B.

Preparation of Optically Transparent Conductive Material 3 (Example 3)

The lower conductive layer 1, the upper conductive layer 2, and a 2-mm-thick PC plate were bonded using an OCA in the bonding order of the PC plate/OCA/the upper conductive layer 2/OCA/the lower conductive layer 1 such that each conductive layer surface is oriented toward the PC plate and that these layers are aligned with each other using alignment marks (+) on the four corners of each layer. Thus, the optically transparent conductive material 3 was produced. In the case of the optically transparent conductive material 3, in the upper conductive layer, the total metal thin wire length in the reduced quadrangle A is 97.5 to 102.5% of the total metal thin wire length in the reduced quadrangle B. In the lower conductive layer, the total metal thin wire length in the reduced quadrangle A is 95 to 105% of the total metal thin wire length in the reduced quadrangle B.

Preparation of Optically Transparent Conductive Material 4 (Example 4)

The lower conductive layer 2, the upper conductive layer 2, and a 2-mm-thick PC plate were bonded using an OCA in the bonding order of the PC plate/OCA/the upper conductive layer 2/OCA/the lower conductive layer 2 such that each conductive layer surface is oriented toward the PC plate and that these layers are aligned with each other using alignment marks (+) on the four corners of each layer. Thus, the optically transparent conductive material 4 was produced. In the case of the optically transparent conductive material 4, in the upper conductive layer and the lower conductive layer, the total metal thin wire length in the reduced quadrangle A is 97.5 to 102.5% of the total metal thin wire length in the reduced quadrangle B.

<Preparation of Lower Conductive Layer 3>

A pattern of a transparent manuscript (lower) 3 to be used to produce the lower conductive layer 3 was produced in the same manner as in the lower conductive layer 1, except that an arrangement of Voronoi diagrams shown in Table 7 was used instead of the arrangement shown in Table 2. As in FIG. 10, FIG. 14 shows segment lengths and ratios thereof in the transparent manuscript (lower) 3. The metal silver image of the lower conductive layer 3 obtained had the same pattern and the same line width as those of the transparent manuscript (lower) 3. The film thickness of the metal silver image was 0.1 μm as measured with a confocal microscope. In the transparent manuscript (lower) 3 shown in Table 7, the total thin wire length in a reduced quadrangle A in a region (Rx4:Tx8) is 105.7% of the total thin wire length in a reduced quadrangle B in its adjacent region (Rx4:Tx9) sharing a side therewith; and also, the total thin wire length in the reduced quadrangle A in the region (Rx4:Tx9) is 94.6% of the total thin wire length in the reduced quadrangle B in its adjacent region (Rx4:Tx8) sharing a side therewith. In addition, the total thin wire length in the reduced quadrangle A in a region (Rx9:Tx3) is 94.6% of the total thin wire length in the reduced quadrangle B in each of its adjacent regions (Rx9:Tx2) and (Rx8:Tx3) each sharing a side therewith; and also, the total thin wire length in the reduced quadrangle A in the region (Rx9:Tx2) and the total thin wire length in the reduced quadrangle A in the region (Rx8:Tx3) are each 105.7% of the total thin wire length in the reduced quadrangle B in their adjacent region (Rx9:Tx3) sharing a side therewith.

in the reduced quadrangle A in a region (Rx9:Tx2) is 105.3% of the total thin wire length in the reduced quadrangle B in its adjacent region (Rx9:Tx3) sharing a side therewith. In addition, the total thin wire length in the reduced quadrangle A in a region (Rx7:Tx10) is 94.8% of the total thin wire length in the reduced quadrangle B in its adjacent region (Rx7:Tx9) sharing a side therewith; the total thin wire length in the reduced quadrangle A in the region (Rx7:Tx9) is 105.5% of the total thin wire length in the reduced quadrangle B in its adjacent region (Rx7:Tx10) sharing a side therewith; and the total thin wire length in the reduced quadrangle A in a region (Rx6:Tx10) is 105.3% of the total thin wire length in the reduced quadrangle B in its adjacent region (Rx7:Tx10) sharing a side therewith.

TABLE 7

|  | (Rx1) | (Rx2) | (Rx3) | (Rx4) | (Rx5) | (Rx6) | (Rx7) | (Rx8) | (Rx9) | (Rx10) |
|---|---|---|---|---|---|---|---|---|---|---|
| Tx1 | 13 | 14 | 15 | 16 | 6 | 11 | 16 | 2 | 4 | 2 |
| Tx2 | 9 | 10 | 11 | 12 | 7 | 15 | 11 | 16 | 15 | 7 |
| Tx3 | 5 | 6 | 7 | 8 | 12 | 4 | 7 | 15 | 9 | 13 |
| Tx4 | 1 | 2 | 3 | 4 | 6 | 14 | 16 | 10 | 7 | 3 |
| Tx5 | 16 | 8 | 16 | 9 | 16 | 2 | 15 | 5 | 1 | 10 |
| Tx6 | 10 | 5 | 11 | 7 | 6 | 1 | 11 | 15 | 5 | 9 |
| Tx7 | 1 | 8 | 5 | 13 | 9 | 10 | 12 | 14 | 2 | 10 |
| Tx8 | 4 | 2 | 1 | 15 | 8 | 1 | 7 | 13 | 8 | 6 |
| Tx9 | 8 | 16 | 14 | 9 | 7 | 11 | 5 | 3 | 12 | 2 |
| Tx10 | 6 | 4 | 7 | 4 | 15 | 1 | 3 | 15 | 6 | 9 |

<Preparation of Upper Conductive Layer 3>

A pattern of a transparent manuscript (upper) 3 to be used to produce the upper conductive layer 3 was produced in the same manner as in the upper conductive layer 1, except that an arrangement of Voronoi diagrams shown in Table 8 was

TABLE 8

|  | Rx1 | Rx2 | Rx3 | Rx4 | Rx5 | Rx6 | Rx7 | Rx8 | Rx9 | Rx10 |
|---|---|---|---|---|---|---|---|---|---|---|
| (Tx1) | 28 | 26 | 31 | 29 | 24 | 17 | 20 | 21 | 17 | 19 |
| (Tx2) | 30 | 32 | 28 | 24 | 18 | 27 | 22 | 17 | 31 | 23 |
| (Tx3) | 23 | 24 | 27 | 22 | 20 | 25 | 29 | 23 | 28 | 30 |
| (Tx4) | 28 | 23 | 28 | 27 | 24 | 23 | 24 | 26 | 27 | 18 |
| (Tx5) | 18 | 32 | 22 | 25 | 26 | 24 | 25 | 17 | 29 | 31 |
| (Tx6) | 21 | 20 | 30 | 22 | 18 | 19 | 22 | 28 | 30 | 26 |
| (Tx7) | 20 | 32 | 31 | 32 | 29 | 23 | 24 | 19 | 22 | 24 |
| (Tx8) | 27 | 21 | 26 | 21 | 20 | 24 | 25 | 28 | 32 | 19 |
| (Tx9) | 31 | 26 | 27 | 30 | 26 | 25 | 29 | 27 | 21 | 18 |
| (Tx10) | 20 | 19 | 30 | 32 | 17 | 31 | 28 | 17 | 30 | 24 | used instead of the arrangement shown in Table 4. As in FIG. 10, FIG. 15 shows segment lengths and ratios thereof in the transparent manuscript (upper) 3. The metal silver image of the upper conductive layer 3 obtained had the same pattern and the same line width as those of the transparent manuscript (upper) 3. The film thickness of the metal silver image was 0.1 μm as measured with a confocal microscope. In the transparent manuscript (upper) 3 shown in Table 8, the total thin wire length in the reduced quadrangle A in a region (Rx3:Tx1) is 105.3% of the total thin wire length in the reduced quadrangle B in its adjacent region (Rx3:Tx2) sharing a side therewith; and also, the total thin wire length Preparation of Optically Transparent Conductive Material 5 (Comparative Example 1)

The lower conductive layer 3 and the upper conductive layer 3 obtained as above and a 2-mm-thick PC plate were bonded using an OCA in the bonding order of the PC plate/OCA/the upper conductive layer 3/OCA/the lower conductive layer 3 such that each conductive layer surface is oriented toward the PC plate and that these layers are aligned with each other using alignment marks (+) on the four corners of each layer. Thus, the optically transparent conductive material 5 was produced. In the case of the optically transparent conductive material 5, the upper conductive layer and the lower conductive layer each include a portion where the total metal thin wire length in the reduced quadrangle A is not 95 to 105% of the total metal thin wire length in the reduced quadrangle B.

Preparation of Optically Transparent Conductive Material 6 (Comparative Example 2)

The lower conductive layer 3, the upper conductive layer 1, and a 2-mm-thick PC plate were bonded using an OCA in the bonding order of the PC plate/OCA/the upper conductive layer 1/OCA/the lower conductive layer 3 such that each conductive layer surface is oriented toward the PC plate and that these layers are aligned with each other using alignment marks (+) on the four corners of each layer. Thus, the optically transparent conductive material 6 was produced. In the case of the optically transparent conductive material 6, the lower conductive layer includes a portion where the total metal thin wire length in the reduced quadrangle A is not 95 to 105% of the total metal thin wire length in the reduced quadrangle B.

Preparation of Optically Transparent Conductive Material 7 (Comparative Example 3)

The lower conductive layer 1, the upper conductive layer 3, and a 2-mm-thick PC plate were bonded using an OCA in the bonding order of the PC plate/OCA/the upper conductive layer 3/OCA/the lower conductive layer 1 such that each conductive layer surface is oriented toward the PC plate and that these layers are aligned with each other using alignment marks (+) on the four corners of each layer. Thus, the optically transparent conductive material 7 was produced. In the case of the optically transparent conductive material 7, the upper conductive layer includes a portion where the total metal thin wire length in the reduced quadrangle A is not 95 to 105% of the total metal thin wire length in the reduced quadrangle B.

<Preparation of Lower Conductive Layer 4>
A pattern of a transparent manuscript (lower) 4 to be used to produce the lower conductive layer 4 was produced in the same manner as in the lower conductive layer 1, except that an arrangement of Voronoi diagrams shown in Table 9 was used instead of the arrangement shown in Table 2. Similar to FIG. 10, FIG. 16 shows segment lengths and ratios thereof in the transparent manuscript (lower) 4. The metal silver image of the lower conductive layer 4 obtained had the same pattern and the same line width as those of the transparent manuscript (lower) 4. The film thickness of the metal silver image was 0.1 μm as measured with a confocal microscope. In the transparent manuscript (lower) 4 shown in Table 9, a Voronoi diagram 15 shown Table 1 is used as the Voronoi diagram in all of a region (Rx7:Tx6) and in its adjacent regions (Rx7:Tx5) and (Rx8:Tx6) each sharing a side therewith. Thus, the reduced quadrangles in these regions have the same net-like pattern.

TABLE 9

|      | (Rx1) | (Rx2) | (Rx3) | (Rx4) | (Rx5) | (Rx6) | (Rx7) | (Rx8) | (Rx9) | (Rx10) |
|------|-------|-------|-------|-------|-------|-------|-------|-------|-------|--------|
| Tx1  | 13    | 14    | 15    | 16    | 6     | 11    | 16    | 2     | 4     | 2      |
| Tx2  | 9     | 10    | 11    | 12    | 7     | 15    | 11    | 16    | 15    | 7      |
| Tx3  | 5     | 6     | 7     | 8     | 12    | 4     | 7     | 15    | 10    | 13     |
| Tx4  | 1     | 2     | 3     | 4     | 6     | 14    | 16    | 10    | 7     | 3      |
| Tx5  | 16    | 8     | 16    | 9     | 16    | 2     | 15    | 5     | 1     | 10     |
| Tx6  | 10    | 5     | 11    | 7     | 6     | 1     | 15    | 15    | 5     | 9      |
| Tx7  | 1     | 8     | 5     | 13    | 9     | 10    | 12    | 14    | 2     | 10     |
| Tx8  | 4     | 2     | 1     | 15    | 8     | 1     | 7     | 13    | 8     | 6      |
| Tx9  | 8     | 16    | 14    | 5     | 7     | 11    | 5     | 3     | 12    | 2      |
| Tx10 | 6     | 4     | 7     | 4     | 15    | 1     | 3     | 15    | 6     | 9      |

Preparation of Optically Transparent Conductive Material 8 (Comparative Example 4)

The lower conductive layer 4 and the upper conductive layer 1 obtained as above and a 2-mm-thick PC plate were bonded using an OCA in the bonding order of the PC plate/OCA/the upper conductive layer 1/OCA/the lower conductive layer 4 such that each optically transparent conductive layer surface is oriented toward the PC plate and that these layers are aligned with each other using alignment marks (+) on the four corners of each layer. Thus, the optically transparent conductive material 8 was produced. In the case of the optically transparent conductive material 8, the lower conductive layer includes a portion where the net-like pattern of metal thin wires in the reduced quadrangle A is the same as the net-like pattern of metal thin wires in the reduced quadrangle B.

The optically transparent conductive materials 1 to 8 obtained were evaluated for visibility and variations in the node capacitance according to the following procedure.
<Visibility>
The optically transparent conductive materials 1 to 8 obtained were individually placed on a screen of a 21.5 wide LCD monitor (I2267FWH available from AOC) displaying a solid white image, and were each evaluated as poor for visible moire or pattern irregularity or good for no visible moire or pattern irregularity.
<Variation in Node Capacitance>
The optically transparent conductive materials 1 to 5 obtained were individually placed on separate insulation sheets to measure the capacitance of each node position. Based on comparison of the capacitance at 100 node positions, these optically transparent conductive materials were each evaluated as poor for significant variations, slightly poor for rather significant variations, good for minor variations, or excellent for almost no variations. The results are shown with the results of <Visibility> in Table 10.

TABLE 10

| | Optically transparent conductive material | Lower conductive layer | Upper conductive layer | Visibility | Variations in capacitance |
|---|---|---|---|---|---|
| Example 1 | 1 | 1 | 1 | Good | Good |
| Example 2 | 2 | 2 | 1 | Good | Good |
| Example 3 | 3 | 1 | 2 | Good | Good |
| Example 4 | 4 | 2 | 2 | Good | Excellent |
| Comparative Example 1 | 5 | 3 | 3 | Good | Poor |
| Comparative Example 2 | 6 | 3 | 1 | Good | Slightly poor |
| Comparative Example 3 | 7 | 1 | 3 | Good | Slightly poor |
| Comparative Example 4 | 8 | 4 | 1 | Poor | Good |

It is clear from the results shown in Table 10 that the present invention can provide an optically transparent conductive material that does not cause moire or a pattern visibility problem even when superimposed on a liquid crystal display and that reduces variations in the capacitance at the nodes. In contrast, the capacitance varied significantly in the optically transparent conductive materials 5 to 7 each including the lower conductive layer 3 and/or the upper conductive layer 3 in which the total metal thin wire length in the reduced quadrangle A in the node unit zone is not 95 to 105% of the total metal thin wire length in the reduced quadrangle B in the adjacent node unit zone. Further, the visibility was observed to be poor in the optically transparent conductive material 8 including the lower conductive layer 4 with the Voronoi diagrams shown in Table 9 including a portion where the node unit zone and its adjacent node unit zones have the same net-like pattern.

REFERENCE SIGNS LIST

1 upper conductive layer
2 lower conductive layer
3 optically transparent conductive material
21 sensor part
22 dummy part
23 peripheral wiring part
24 terminal area
41, 42 centerline
43, 44 boundary line
60 plane
61 region
62 boundary line of region
63 original polygon
64 center of gravity of original polygon
65 reduced polygon
71, 81 node unit zone
72, 83, 91 reduced quadrangle
82 center of gravity of node unit zone and reduced quadrangle
84 diagonal length of node unit zone
85 diagonal length of reduced quadrangle
86 imaginary outline showing boundary between sensor part and dummy part
92 generator group in adjacent node unit zone
93 original polygon located at outermost of node unit zone
411 intersection
611 generator

The invention claimed is:

1. An optically transparent conductive material comprising:
two layers comprising an upper conductive layer and a lower conductive layer in a stack with an insulation layer therebetween,
wherein the upper conductive layer and the lower conductive layer each include at least sensor parts to be electrically connected to terminal areas and dummy parts not to be electrically connected to the terminal areas, the sensor parts and the dummy parts each being formed in a net-like irregular pattern of metal thin wires,
the sensor parts of the lower conductive layer are formed with multiple linear electrodes that extend in a first direction and that are repetitively aligned with a period L in a second direction perpendicular to the first direction with the dummy part between each linear electrode, and the sensor parts of the upper conductive layer are formed with multiple linear electrodes that extend in a third direction and that are repetitively aligned with a period M in a fourth direction perpendicular to the third direction with the dummy part between each linear electrode,
in a view from a direction perpendicular to a conductive layer plane, in the case where an intersection as a node between a centerline of each linear electrode of the upper conductive layer and a centerline of each linear electrode of the lower conductive layer is regarded as the center of gravity; zones obtained by dividing the conductive layer plane into quadrangles by straight lines each obtained by shifting the centerline of each linear electrode of the lower conductive layer in the second direction by half the length equivalent to the period L and by straight lines each obtained by shifting the centerline of each linear electrode of the upper conductive layer in the fourth direction by half the length equivalent to the period M are regarded as node unit zones; a node unit zone sharing a side of a quadrangle of an arbitrary selected node unit zone is regarded as an adjacent node unit zone; in each node unit zone, a quadrangle whose diagonal length is 80% of the diagonal length of the node unit zone is regarded as a reduced quadrangle A; and in each adjacent node unit zone, a quadrangle whose diagonal length is 80% of the diagonal length of the adjacent node unit zone is regarded as a reduced quadrangle B,
in each of the upper conductive layer and the lower conductive layer, the net-like pattern of metal thin wires in the reduced quadrangle A is not the same as the net-like pattern of metal thin wires in the reduced quadrangle B, and the total metal thin wire length in the reduced quadrangle A is 95 to 105% of the total metal thin wire length in the reduced quadrangle B.

2. The optically transparent conductive material according to claim 1,
wherein each node unit zone has the same center of gravity as the reduced quadrangle in the node unit zone.

3. The optically transparent conductive material according to claim 1,
wherein the total metal thin wire length in the reduced quadrangle A is 97.5 to 102.5% of the total metal thin wire length in the reduced quadrangle B.

4. The optically transparent conductive material according to claim 1,
wherein the sensor parts and the dummy parts in one conductive layer are each formed in a pattern of metal thin wires with the same wire width.

5. The optically transparent conductive material according to claim 1, wherein the centerline of each linear electrode of the upper conductive layer perpendicularly intersects the centerline of each linear electrode of the lower conductive layer.

6. The optically transparent conductive material according to claim 1,
wherein the net-like pattern of the metal thin wires is a net-like pattern formed with Voronoi edges based on generators or a net-like pattern obtained by unidirectionally stretching the net-like pattern formed with Voronoi edges based on generators.

* * * * *